US008181056B2

(12) United States Patent
Oh

(10) Patent No.: US 8,181,056 B2
(45) Date of Patent: May 15, 2012

(54) SERIAL-CONNECTED MEMORY SYSTEM WITH OUTPUT DELAY ADJUSTMENT

(75) Inventor: HakJune Oh, Kanata (CA)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 588 days.

(21) Appl. No.: 12/241,832

(22) Filed: Sep. 30, 2008

(65) Prior Publication Data

US 2010/0083027 A1    Apr. 1, 2010

(51) Int. Cl.
G06F 1/04        (2006.01)
H04L 7/00        (2006.01)
(52) U.S. Cl. .................. 713/401; 713/503; 713/601
(58) Field of Classification Search .................. 710/401; 713/401
See application file for complete search history.

(56) References Cited

U.S. PATENT DOCUMENTS

| | | | |
|---|---|---|---|
| 4,839,866 A | 6/1989 | Ward et al. |
| 4,962,483 A | 10/1990 | Lodhi |
| 5,140,688 A | 8/1992 | White et al. |
| 5,319,598 A | 6/1994 | Aralis et al. |
| 5,357,621 A | 10/1994 | Cox |
| 5,404,460 A | 4/1995 | Thomsen et al. |
| 5,465,076 A | 11/1995 | Yamauchi et al. |
| 5,475,854 A | 12/1995 | Thomsen et al. |
| 5,546,023 A | 8/1996 | Borkar et al. |
| 5,614,855 A | 3/1997 | Lee et al. |
| 5,708,686 A | 1/1998 | Assmus et al. |
| 5,754,838 A | 5/1998 | Shibata et al. |
| 5,757,218 A | 5/1998 | Blum |
| 5,778,419 A | 7/1998 | Hansen et al. |
| 5,963,071 A | 10/1999 | Dowlatabadi |
| 6,002,638 A | 12/1999 | John |
| 6,046,620 A | 4/2000 | Relph |
| 6,060,922 A | 5/2000 | Chow et al. |
| 6,125,157 A | 9/2000 | Donnelly et al. |
| 6,144,576 A | 11/2000 | Leddige et al. |
| 6,285,226 B1 | 9/2001 | Nguyen |
| 6,289,468 B1 | 9/2001 | Godfrey |
| 6,304,921 B1 | 10/2001 | Rooke |

(Continued)

FOREIGN PATENT DOCUMENTS

WO    WO 2008/070978    6/2008

OTHER PUBLICATIONS

International Search Report, PCT/CA2009/001271, dated Nov. 16, 2009.

(Continued)

*Primary Examiner* — Ryan Stiglic

(57) ABSTRACT

Systems and methods for performing output delay adjustment are provided for application in serial-connected devices operating as slave devices. A master device provides a clock to the first slave device, and each slave device passes the clock to the next slave device in turn, and the last slave device returns the clock to the master device. The master device compares the outgoing clock to the returned clock and determines if an output delay adjustment is needed. If so, the master device generates and outputs commands for the slave devices to perform output delay adjustment. The slave devices apply the output delay to the clock signal, but may also apply the delay to other output signals. Each of the slave devices has a circuit for performing output delay adjustment. In some implementations, each slave device is a memory device, and the master device is a memory controller.

31 Claims, 10 Drawing Sheets

U.S. PATENT DOCUMENTS

| | | | |
|---|---|---|---|
| 6,373,289 B1 | 4/2002 | Martin et al. | |
| 6,426,660 B1 | 7/2002 | Ho et al. | |
| 6,466,071 B2 | 10/2002 | Kim et al. | |
| 6,473,439 B1 | 10/2002 | Zerbe et al. | |
| 6,496,552 B2 | 12/2002 | Tomofuji et al. | |
| 6,502,161 B1 | 12/2002 | Perego et al. | |
| 6,518,809 B1 | 2/2003 | Kotra | |
| 6,542,015 B2 | 4/2003 | Zhou et al. | |
| 6,583,657 B1 | 6/2003 | Eckhardt et al. | |
| 6,625,687 B1 | 9/2003 | Halbert et al. | |
| 6,654,307 B2 | 11/2003 | Widmer et al. | |
| 6,658,509 B1 | 12/2003 | Bonella et al. | |
| 6,680,637 B2 | 1/2004 | Seo | |
| 6,708,248 B1 | 3/2004 | Garrett, Jr. et al. | |
| 6,715,020 B2 | 3/2004 | Farmwald et al. | |
| 6,715,044 B2 | 3/2004 | Lofgren et al. | |
| 6,750,689 B2 | 6/2004 | Fletcher et al. | |
| 6,831,493 B2 | 12/2004 | Ma | |
| 6,832,325 B2 | 12/2004 | Liu | |
| 6,844,766 B2 | 1/2005 | Sun | |
| 6,847,617 B2 | 1/2005 | Borkar et al. | |
| 6,877,079 B2 | 4/2005 | Yoo et al. | |
| 6,920,540 B2 | 7/2005 | Hampel et al. | |
| 6,928,501 B2 | 8/2005 | Andreas et al. | |
| 6,943,604 B2 | 9/2005 | Minzoni | |
| 6,944,697 B2 | 9/2005 | Andreas | |
| 6,950,325 B1 | 9/2005 | Chen | |
| 6,958,639 B2 | 10/2005 | Park et al. | |
| 6,968,436 B2 * | 11/2005 | Kumazawa | 711/167 |
| 6,990,042 B2 | 1/2006 | Stark | |
| 6,993,616 B2 | 1/2006 | McLachlan | |
| 7,017,002 B2 | 3/2006 | Perego et al. | |
| 7,031,221 B2 | 4/2006 | Mooney et al. | |
| 7,035,269 B2 | 4/2006 | Rolston et al. | |
| 7,051,129 B2 | 5/2006 | Horowitz et al. | |
| 7,098,712 B2 | 8/2006 | Lee | |
| 7,109,767 B1 * | 9/2006 | Amick et al. | 327/158 |
| 7,124,270 B2 | 10/2006 | Dillon et al. | |
| 7,148,731 B2 | 12/2006 | Minzoni | |
| 7,187,221 B2 | 3/2007 | Kim et al. | |
| 7,212,055 B2 | 5/2007 | Yoo et al. | |
| 7,221,613 B2 | 5/2007 | Pelley et al. | |
| 7,227,396 B2 | 6/2007 | Minzoni | |
| 7,236,557 B1 | 6/2007 | Nguyen | |
| 7,242,635 B2 | 7/2007 | Okuda | |
| 7,274,236 B2 | 9/2007 | Lee | |
| 7,312,647 B2 | 12/2007 | Choi et al. | |
| 7,322,001 B2 | 1/2008 | Boerstler et al. | |
| 7,342,816 B2 | 3/2008 | Bartley et al. | |
| 7,350,093 B2 * | 3/2008 | Janzen | 713/401 |
| 7,735,037 B2 * | 6/2010 | Tell | 716/113 |
| 7,802,212 B2 * | 9/2010 | Best et al. | 716/104 |
| 7,885,140 B2 * | 2/2011 | Gillingham et al. | 365/233.1 |
| 2002/0122347 A1 | 9/2002 | Frulio et al. | |
| 2003/0085744 A1 * | 5/2003 | Heo et al. | 327/158 |
| 2004/0024960 A1 | 2/2004 | King et al. | |
| 2004/0027182 A1 | 2/2004 | Brox et al. | |
| 2004/0148482 A1 | 7/2004 | Grundy et al. | |
| 2005/0058233 A1 | 3/2005 | Nguyen et al. | |
| 2005/0160247 A1 | 7/2005 | Dillon et al. | |
| 2006/0031593 A1 | 2/2006 | Sinclair | |
| 2006/0036827 A1 | 2/2006 | Dell et al. | |
| 2006/0044029 A1 | 3/2006 | Gomm et al. | |
| 2006/0047990 A1 | 3/2006 | James et al. | |
| 2006/0083043 A1 | 4/2006 | Cypher | |
| 2006/0198202 A1 | 9/2006 | Erez | |
| 2006/0236147 A1 * | 10/2006 | Best et al. | 713/400 |
| 2007/0005831 A1 | 1/2007 | Gregorius | |
| 2007/0046351 A1 | 3/2007 | Minzoni | |
| 2007/0058480 A1 | 3/2007 | Hwang | |
| 2007/0064629 A1 | 3/2007 | Regev et al. | |
| 2007/0076479 A1 | 4/2007 | Kim et al. | |
| 2007/0109833 A1 | 5/2007 | Pyeon et al. | |
| 2007/0143677 A1 | 6/2007 | Pyeon et al. | |
| 2007/0153576 A1 | 7/2007 | Oh et al. | |
| 2007/0165457 A1 | 7/2007 | Kim | |
| 2007/0233903 A1 | 10/2007 | Pyeon | |
| 2007/0233917 A1 | 10/2007 | Pyeon et al. | |
| 2007/0234071 A1 | 10/2007 | Pyeon | |
| 2008/0013662 A1 | 1/2008 | Sidiropoulos | |
| 2008/0201588 A1 | 8/2008 | Pyeon et al. | |
| 2008/0209095 A1 | 8/2008 | Allen et al. | |
| 2008/0235412 A1 * | 9/2008 | Lai et al. | 710/31 |
| 2010/0083027 A1 | 4/2010 | Oh | |
| 2010/0083028 A1 * | 4/2010 | Oh | 713/601 |
| 2010/0135100 A1 * | 6/2010 | Chiu | 365/233.11 |

OTHER PUBLICATIONS

IEEE Standard for High-Bandwidth Memory Interface Based on Scalable Coherent Interface (SCI) Signaling Technology (RamLink); IEEE Std 1596.4-1996; Approved Mar. 19, 1996.

Nam, Jang-Jin, et al.; An All-Digital CMOS Duty Cycle Correction Circuit with a Duty-Cycle Correction Range of 15-to-85% for Multi-Phase Applications; IEICE Trans. Electron, vol. E88-C, No. 4, Apr. 2005.

Atmel Two-wire Serial EEPROM; 0180Y-SEEPR-2/06.

Atmel 8-megabit 2.5-volt Only or 2.7-volt Only DataFlash; Rev. 2225H-DFLSH-10/04.

Diamond, Stephen L; SyncLink: High-speed DRAM for the future, Micro Standards, IEEE Micro.

Woo, Steven; DRAM and Memory System Trends; Oct. 24, 2004.

Gjessing, Stein, et al.; RamLink: A High-Bandwidth Point-to-Point Memory Architecture; IEEE, 1992.

Gjessing, Stein, et al.; Performance of the RamLink Memory Architecture; IEEE, 1994.

Special Report/Memory; A RAM Link for High Speed, IEEE Spectrum, Oct. 1992.

HyperLink NAND (HLNAND™) Flash Specification HL1-200/HL1-266; Version 1.61, May 25, 2007.

Intel Leap Ahead, Multiply Your Innovation and Maximize Your Potential, Multiply Your Knowledge, Intel Developer Forum.

Microchip 24AA1025/24LC1025/24FC1025, 1024K I²C™ CMOS Serial EEPROM, 2006 Microchip Technology Inc.

Micron, NAND Flash Memory features.

ONFi, Open NAND Flash Interface Specification, Revision 2.0, Feb. 27, 2008.

ONFi, ONFi Breaks Speed Barrier for NAND Flash, Search Results for Google, Nov. 14, 2007.

ONFi, Open NAND Flash Interface Specification, Revision 1.0, Dec. 28, 2006.

High-Speed Memory Architectures for Multimedia Applications—Meeting the Requirements of Higher Performance, Circuits & Devices, Jan. 1997.

Hatakeyama, Atsushi, et al.; A 256-Mb SDRAM Using a Register-Controlled Digital DLL; IEEE Journal of Solid-State Circuits, vol. 32, No. 11, Nov. 1997.

16 Mbit SPI Serial Flash, SST25VF016B features.

M25P20, 2 Mbit, Low Voltage, Serial Flash Memory With 40MHz SPI Bus Interface, Aug. 2005.

Takeuchi, Ken, et al.; A 56-nm CMOS 99-mm² 8-Gb Multi-Level NAND Flash Memory With 10-MB/s Program Throughput; IEEE Journal of Solid-State Circuits, vol. 42, No. 1, Jan. 2007.

Toshiba, NAND Flash Applications Design Guide, System Solutions from Toshiba America Electronic Components, Inc., Revision 1.0, Apr. 2003.

Toshiba, TH58NVG1S3AFT05, Tentative Toshiba MOS Digital Integrated Circuit Silicon Gate CMOS, 2003-05-19A.

* cited by examiner

SERIAL-CONNECTED MEMORY SYSTEM WITH OUTPUT DELAY ADJUSTMENT

FIELD

The invention relates generally to solid state memory systems featuring a set of serial-connected memory devices.

BACKGROUND

Conventional NAND flash memory systems use a large number of parallel signals for the commanding, addressing, and data transferring operations. This was a very popular way of configuring memory systems and results in very fast system operation. This is particularly true for random access memory devices like DRAM (dynamic random access memory), SRAM (static random access memory), etc.

A disadvantage arises from this approach in that a large number of parallel signal lines need to be routed to each and every memory device in the memory system. Also, the system power supply must have higher capacity in order to deliver higher peak power for parallel signaling. Write and read throughput for conventional NAND flash memory can be directly increased by using a higher operating frequency. For example, the present operating frequency of about 40 MHz (=25 ns for tRC in NAND Flash) can be increased to about 100~200 MHz. While this approach appears to be straightforward, there is a significant problem with signal quality at such high frequencies, which sets a practical limitation on the operating frequency of the conventional NAND flash memory.

In particular, the conventional NAND flash memory communicates with other components using a set of parallel input/output (I/O) pins, numbering 8 or 16 depending on the desired word configuration, which receive command instructions, receive input data and provide output data. This is commonly known as a parallel interface. High speed operation will cause well known communication degrading effects such as crosstalk, signal skew and signal attenuation, for example, which degrades signal quality. Such parallel interfaces use a large number of pins to read and write data. As the number of input pins and wires increases, so do a number of undesired effects. These effects include inter-symbol interference, signal skew and cross talk.

In order to address some of these disadvantages, several serial-connected system configurations featuring a set of memory devices connected in a ring have been provided. These include 'Multiple Independent Serial Link Memory' (US20070076479A1), 'Daisy Chain Cascading Devices' (US20070109833A1), 'Memory with Output Control' (US20070153576A1), 'Daisy chain cascade configuration recognition technique' (US2007233903A1), and 'Independent Link and Bank Selection' (US2007143677A1), all of which are assigned to the same assignee as this application and are hereby incorporated by reference in their entirety. These systems typically have serial in/out data pins along with two control signals for the enabling and disabling of a serial input port and serial output port respectively in order to provide a memory controller with the maximum flexibility of serial data communication. Some of these memory system configurations employ a shared bus topology for the system clock distribution, which is referred to as a 'common clock system' or 'multi-drop clocking system'. Some of these architectures use a point-to-point serial-connected clocking architecture featuring a DLL (delay locked loop) or PLL (phase locked loop) in every memory chip in order to synchronize two clock signals in each memory device, one being an input clock received from a preceding device or controller and the other being an output clock transmitted to the next device.

SUMMARY OF THE INVENTION

According to one broad aspect, the invention provides a method in a slave device of a plurality of serial-connected slave devices, the method comprising: receiving a command from a master device specifying how the slave device is to adjust a delay to be applied to at least one signal output by the slave device; receiving at least one input signal, the at least one input signal comprising at least an input clock signal; for each of the at least one input signal: generating a delayed version of the input signal in accordance with the command; outputting the delayed version of the input signal.

In some embodiments, the slave device is a memory device and the master device is a memory controller.

In some embodiments, the method comprises: outputting a data output signal; wherein at least one of the input signals comprises a data input signal and wherein outputting the delayed version of the data input signal is performed as part of outputting the data output signal such that: a) some of the time the data output signal is said delayed version of the data input signal; b) some of the time the data output signal is a delayed version of a signal produced locally to the slave device, after applying the delay to the signal produced locally to the slave device in accordance with the command.

In some embodiments, receiving a command from a master device specifying an adjustment to a delay to be applied to at least one signal output by the slave device comprises receiving a command containing a command identifier that identifies the command as an output delay adjustment command, the command further containing data indicating how to adjust the delay.

In some embodiments, receiving a command further comprises receiving a device address indicating which device(s) acting as slave devices is to execute the command.

In some embodiments, the method further comprises: performing the step of, for each of the at least one input signal, generating a delayed version of the input signal in accordance with the command if the command has a device address that matches a device address of the slave device; performing the step of, for each of the at least one input signal, generating a delayed version of the input signal in accordance with the command if the command has a device address that is a broadcast device address.

In some embodiments, for each input signal, generating a delayed version of the input signal comprises: a) delaying the input signal by a selected one of a plurality of delays to produce the delayed version of the input signal.

In some embodiments, the data indicating how to adjust the delay comprises an indication of the selected one of the plurality of delays.

In some embodiments, the plurality of input signals comprise: a clock signal; a command strobe signal; a data strobe signal; a data signal containing commands and data.

According to another broad aspect, the invention provides a method in a memory system comprising a master device and a plurality of serial-connected device acting as slave devices comprising at least a first slave device and a last slave device, the method comprising: in the master device: a) outputting at least one output signal, the at least one output signal comprising a first clock signal to function as an input clock signal of the first slave device; b) receiving a second clock signal that is an output clock signal of the last slave device; c) determining an amount of phase offset between the first clock signal and the second clock signal; d) generating an output delay adjustment command as a function of the phase offset between the first clock signal and the second clock signal and outputting the output delay adjustment command.

In some embodiments, each slave device is a memory device and the master device is a memory controller.

In some embodiments, the method further comprises: in the first slave device of the plurality of serial-connected device acting as slave devices: a) receiving the at least one output signal from the master device as corresponding at least one input signal of the first slave device; b) for each input signal, generating an output signal based on the input signal; in each other slave device of the plurality of serial-connected device acting as slave devices: a) receiving output signal(s) of a preceding slave device corresponding to at least one input signal of the slave device; b) for each input signal, generating an output signal based on the input signal; in at least one of the slave devices, a) receiving the output delay adjustment command; and b) generating the output signal(s) by generating a delayed version of the input signal(s) in accordance with the output delay adjustment command.

In some embodiments, the method further comprises: wherein the at least one output signal of the master device comprises a plurality of output signal(s).

In some embodiments, generating a delay adjustment command comprises generating a delay adjustment command for execution by a specified one of the plurality of serial-connected slave devices.

In some embodiments, generating a delay adjustment command comprises generating a delay adjustment command for execution by all of the plurality of serial-connected slave devices.

In some embodiments, generating a delayed version of the input signal(s) in accordance with the output delay adjustment command comprises generating a delayed version of the input signals(s) delayed by a selected one of a plurality of delays.

In some embodiments, generating a delay adjustment command comprises generating a command containing a command identifier that identifies the command as an output delay adjustment command, and containing data indicating how to adjust the delay.

In some embodiments, the data indicating how to adjust the delay comprises an indication of the selected one of the plurality of delays.

In some embodiments, the method further comprises: the master device outputting output delay adjustment commands that adjust delay by adding a delay one unit delay element in one slave device at a time until the phase offset is acceptable.

In some embodiments, the plurality of input signals comprise: a clock signal; a command strobe signal; a data strobe signal; a data signal containing commands and data.

According to another broad aspect, the invention provides a slave device for use in an arrangement comprising a plurality of serial-connected slave devices, the slave device comprising: a command input for receiving a command from a master device specifying how to perform output delay adjustment; a clock input for receiving an input clock signal; an output delay adjustment circuit for generating a delayed clock signal from the clock input in accordance with the command; a clock output for outputting the delayed clock signal.

In some embodiments, the slave device is a memory device.

In some embodiments, the slave device comprises: a command processing circuit that processes the command, wherein the command contains a command identifier that identifies the command as an output delay adjustment command, and contains data indicating how to adjust the output delay.

In some embodiments, the slave device further comprises: a device address register; wherein the command further comprises a device address indicating which slave device is to execute the command, the slave device configured to execute the command if the device identifier matches contents of the device address register.

In some embodiments, the output delay adjustment circuit comprises: for each of a plurality of input signals, inclusive of the input clock signal, a delay circuit that delays the input signal by a selected one of a plurality of delays to produce a delayed version of the input signal.

In some embodiments, each output delay circuit comprises M unit delay elements, $M>=2$, the duty cycle correction circuit further comprising: an N-to-M decoder that decodes signals received on N input lines, $N>=1$, into a selection of how many of the unit delay elements are to be active in producing the delayed version of the input signal.

According to another broad aspect, the invention provides a memory system comprising: a plurality of serial-connected slave devices comprising at least a first slave device and a last slave device; a master device connected to the first slave device and to the last slave device; the master device configured to output a first clock signal that functions as an input clock signal of the first slave device; a clock input for receiving a second clock signal that is an output clock signal of the last slave device; a phase detector that determines an amount of phase offset between the first clock signal and the second clock signal; a command generator that generates an output delay adjustment command as a function of the amount of phase offset; wherein, the first slave device of the plurality of serial-connected slave devices: a) receives the first clock signal from the master device as the input clock signal of the first slave device; b) generates an output clock signal from the input clock signal; wherein each other slave device of the plurality of serial-connected slave devices: a) receives the output clock signal of a preceding slave device as an input clock signal of the slave device; b) generates an output clock signal from the input clock signal; wherein at least one of the plurality of serial-connected slave devices: a) receives the output delay adjustment command; b) generates the output clock signal of the device by delaying the input clock signal of the device in accordance with the control command.

In some embodiments, the system is a memory system, each slave device is a memory device and the master device is a memory controller.

In some embodiments, the command generator is configured to generate the output delay adjustment command for execution by a specified one of the plurality of serial-connected slave devices.

In some embodiments, the command generator is configured to generate the output delay adjustment for execution by all of the plurality of serial-connected slave devices.

In some embodiments, generating an output delay adjustment command comprises generating a command containing a command identifier that identifies the command as an output delay adjustment command, and containing data indicating how to adjust the output delay.

Methods and apparatus of clock duty cycle correction and/or phase synchronization are provided that do not require DLL or PLL, for a serial-connected memory system, typically including a memory controller and a plurality of memory chips connected in a ring configuration. In some embodiments, the memory controller has a phase/duty cycle detector for detecting phase and duty cycle of a clock signal after having travelled around the ring, and each memory device has one or more controller programmable delay lines that are used to adjust the phase and/or duty cycle of the clock. These are adjusted by commands sent from the memory controller until the phase and duty cycle detected by the memory controller is acceptable.

The methods and apparatus described herein can be applied to any kind of semiconductor integrated circuit system having any kind of semiconductor integrated circuit devices as slave devices in a serial-connected configuration with a common interface between adjacent devices. Examples of integrated circuit types include central processing units, graphics processing units, display controller IC, disk drive IC, memory devices like NAND Flash EEPROM, NOR Flash EEPROM, AND Flash EEPROM, DiNOR Flash EEPROM, Serial Flash EEPROM, DRAM, SRAM, ROM, EPROM, FRAM, MRAM, PCRAM etc.

DETAILED DESCRIPTION

In the following detailed description of sample embodiments of the invention, reference is made to the accompanying drawings which form a part hereof, and in which is shown by way of illustration specific sample embodiments in which the present invention may be practiced. These embodiments are described in sufficient detail to enable those skilled in the art to practice the present invention, and it is to be understood that other embodiments may be utilized and that logical, mechanical, electrical, and other changes may be made without departing from the scope of the present invention. The following detailed description is, therefore, not to be taken in a limiting sense, and the scope of the present invention is defined by the appended claims.

Some of the memory system configurations referred to in the background employ a shared bus topology for the system clock distribution, which is referenced to as a 'common clock system' or 'multi-drop clocking system'. If the system clock is applied to too many memory devices in parallel and the clock signal travels too far from the clock source, typically a memory controller, the maximum operating clock frequency may be limited by the total loading of the clock signal and the distance that the clock travels in the memory system's physical layout.

Some of the memory system configurations referred to in the background use a point-to-point serial-connected clocking architecture featuring a DLL or PLL in each memory device in order to synchronize two clock signals in the memory device, one being an input clock received from a preceding device or controller and the other being an output clock transmitted to the next device. However, having an on-chip DLL or PLL in each memory device can cause a significant amount of power consumption. With an on-chip DLL or PLL, various chip-to-chip clock delays (caused by various interconnect loadings and different wire bonding loadings such as multi-chip stacking or package) accumulate through a large number of serial-connected devices and may be unacceptable for system operation.

Figure 1:
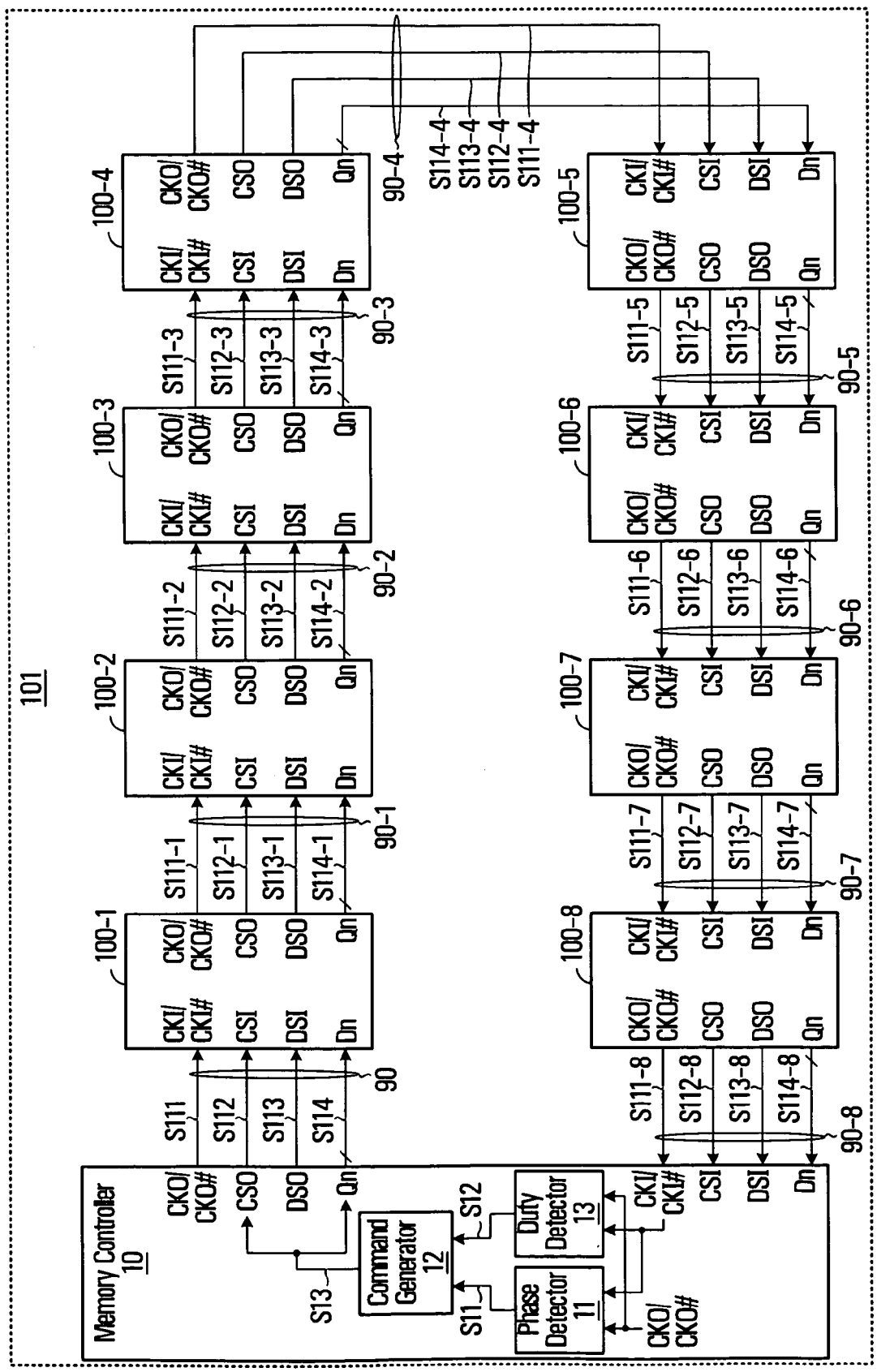
FIG. 1 is a system block diagram of serial-connected memory system having a controller programmable duty cycle correction scheme.

Referring now to FIG. 1, shown is a system block diagram of a serial-connected memory system generally indicated at 101 employing a controller programmable duty cycle correction scheme. The memory system 101 includes a memory controller 10 as a master device connected to a first memory device 100-1. Memory device 100-1 is the first of a series of slave devices including devices 100-1 through 100-8 that are connected in a ring configuration, with the last device 100-8 connected back to the memory controller 10. In the illustrated example a highly multiplexed unidirectional point-to-point bus architecture is provided to transfer information such as commands, addresses and data from the memory controller 10 to the memory devices 100-1 to 100-8. This bus architecture includes a link 90 from the memory controller 10 to the first memory device 100-1, and a respective link between each pair of adjacent memory devices, these including links 90-1 through 90-7, and a link 90-8 between the last memory device 100-8 and the memory controller 10.

In the illustrated example, each link includes a set of signals output by a preceding device (the memory controller 10 or a memory device) for receipt by a succeeding device. Each link includes a set of output ports of a preceding device, a set of input ports of a succeeding device, and a set of physical interconnections between the output ports and the input ports. For convenience, the output ports will be given the same name as the signals they output and the input ports will be given the same name as the signals they receive. In the illustrated example, the signals (and output ports) of a preceding device are referred to as CSO (Command Strobe Output), DSO (Data Strobe Output), Qn (Data Output), CKO/CKO# (differential clock output signals). The corresponding signals (and input ports) of a succeeding device are referred to as CSI (Command Strobe Input), DSI (Data Strobe Input), Dn (Data Input), CKI/CKI# (differential clock input signals). There may be additional ports or signals (for example, CE# (chip enable) or RST# (reset) or power supplies pins) that are not shown for better understanding and simplicity. The physical interconnections include differential clock buses S111, S111-1 to S111-8 for differential clock signals, S112, S112-1 to S112-8 for command strobe, S113, S113-1 to S113-8 for data strobe, S114, S114-1 to S114-8 for data.

In some embodiments, the data output Qn and the data input Dn may have different data widths with n=0 for 1-bit Link setting; n=0, 1 for 2-bit Link setting; n=0, 1, 2, 3 for 4-bit Link setting; n=0, 1, 2, 3, 4, 5, 6, 7 for 8-bit Link setting and so on. In some embodiments, the width of the link may be programmed through a link configuration register to utilize 1, 2, 4, or 8 of a device package's available data input and output pins. This feature allows these memory devices to operate in a ring configuration together with devices that have smaller or larger maximum link widths provided they are all programmed to use the same link width. See for example 'Switching Method of Link and Bit Width' (WO 2008/070978), hereby incorporated by reference in its entirety.

CKI/CKI# are input clocks. A Command/Address Packet on the Dn port delineated by CSI is latched on the rising edges of CKI or the failing edges of CKI#. A Write Data Packet on Dn delineated by DSI is latched on the rising edges of CKI or the failing edges of CKI#.

CKO/CKO# are output clocks which are delayed version of CKI/CKI#. CSO, DSO and Qn signals are referenced to the rising edges of CKO or to the failing edges of CKO#; for example, a Read Data Packet on Qn delineated by DSO is referenced at the rising edges of CKO or the failing edges of CKO#.

When Command Strobe Input (CSI) is HIGH, Command/Address Packets through Dn are latched on the rising edges of CKI or failing edges of CKI#.

Command Strobe Output (CSO) is an echo signal of CSI. It echoes CSI transitions with a latency tIOL that in a particular implementation is a two clock cycle latency referenced to the rising edges of CKO or to the failing edges of CKO#. Two clock cycle latency is an implementation detail; more generally it could be any number of clock cycles appropriate for a given design.

When Data Strobe Input (DSI) is HIGH while the memory device is in 'Read-Mode', it enables the read data output path and Qn buffer (not shown). If DSI is LOW, the Qn buffer holds the previous data accessed. If DSI is HIGH while the memory device is in 'Write-Mode', it enables a Dn buffer and receives Write Data Packet on the rising edges of CKI or failing edges of CKI#.

Data Strobe Output (DSO) is an echo signal of DSI. It echoes DSI transitions with latency tIOL referenced to the rising edges of CKO or to the failing edges of CKO#. As indicated above, tIOL is two clock cycles in a particular implementation.

Data Input signal Dn (n=0, 1, 2, 3, 4, 5, 6 or 7) carries command, address and/or input data information. If the chip is configured in '1-bit Link mode', D0 is the only valid signal and receives one byte of a packet in eight clock cycles. If the chip is configured in '2-bit Link mode', D0 & D1 are valid signals and receive one byte of a packet in four clock cycles. If the chip is configured in '4-bit Link mode', D0, D1, D2 & D3 are valid signals and receive one byte of a packet in two clock cycles. If the chip is configured in '8-bit Link mode', D0, D1, D2, D3, D4, D5, D6 & D7 are all valid signals and receive one byte of a packet in one clock cycle.

Data Output signal Qn (n=0, 1, 2, 3, 4, 5, 6 or 7) carries output data during a read operation or bypasses command, address or input data received on Dn. If the chip is configured in '1-bit Link mode', Q0 is the only valid signal and transmits one byte of a packet in eight clock cycles. If the chip is configured in '2-bit Link mode', Q0 & Q1 are valid signals and transmit one byte of a packet in four clock cycles. If the chip is configured in '4-bit Link mode', Q0, Q1, Q2 & Q3 are valid signals and transmit one byte of a packet in two clock cycles. If the chip is configured in '8-bit Link mode', Q0, Q1, Q2, Q3, Q4, Q5, Q6 & Q7 are all valid signals and transmit one byte of a packet in one clock cycle.

It should be clearly understood that the number of ports and the signals they contain for transmission between adjacent pairs of devices and serial-connected memory systems are implementation specific and are not necessarily those depicted in FIG. 1. More generally, at least a clock signal is conveyed between each pair of consecutive devices. There may be additional signals that are conveyed between the consecutive devices, and specific examples of these have been given above. It is also noted that the particular number of memory devices, eight in the example of FIG. 1, is an implementation specific detail. Any appropriate number of devices can be interconnected in the serial-connected architecture. Note that the expression "serial-connected" in this context is referring to the serial arrangement of memory devices, one after the other and not to the nature of the link between each pair of adjacent devices which may be serial or parallel in nature.

The memory controller 10 contains a phase detector 11, a duty detector 13 and a command generator 12. In some embodiments, the memory controller 10 only includes the phase detector 11 in which case only output delay adjustment is performed. In some embodiments, the memory controller 10 includes only the duty detector 13 in which case only duty cycle correction is performed. In some embodiments, both the phase detector 11 and the duty detector 13 are included in which case both output delay adjustment and duty cycle correction may be performed. This last case is assumed in the detailed description which follows. The phase detector 11 and the duty detector 13 are connected to the command generator 12 through signal buses S11 and S12 respectively. The command generator 12 has an output signal bus S13 connected to CSO and Qn ports through which it can output commands.

The memory controller 10 drives the differential clock buses, S111, from its port CKO/CKO#, and all eight memory devices 100-1~100-8 receive the differential clock buses through their own clock ports, CKI/CKI#, from the previous device's CKO/CKO# ports in a series flow-through manner. The memory controller 10 drives three different buses, S112, S113 and S114 through its ports, CSO, DSO and Qn, respectively. The first memory device 100-1 receives the three buses, S112, S113 and S114, through its ports, CSI, DSI and Dn, respectively, and the first memory device 100-1 re-drives (echoes) three corresponding buses, S112-1, S113-1 and S114-1 through its output ports, CSO, DSO and Qn, respectively, with 2 clock cycles of latency (=tIOL). The second memory device 100-2 receives the three buses, S112-1, S113-1 and S114-1, through its input ports, CSI, DSI and Dn, respectively. This approach applies to all of the eight memory devices 100-1~100-8 with the final buses, S112-8, S113-8 and S114-8, connected back to the memory controller 10 through the memory controller's input ports, CSI, DSI and Dn, respectively.

In operation, for duty cycle correction, the duty detector 13 monitors a duty ratio of CKI/CKI# which is the clock input after it has been passed between all of the devices 100-1 to 100-8 in the ring. If the duty detector 13 detects a duty error from CKI/CKI#, namely a deviation in the duty cycle from a desired duty cycle, it asserts through signal bus S12 either a 'Duty_Add' to indicate the duty cycle is shorter than the desired duty cycle and should be lengthened or 'Duty_Sub' to indicate the duty cycle is longer than the desired duty cycle and should be shortened. In response, the command generator 12 generates an appropriate "Write Duty Cycle Register" command packet.

In operation, for output delay adjustment, the phase detector 11 monitors the phase of CKI/CKI#. If the phase detector 11 detects a phase error (PE) between CKI/CKI# and CKO/CKO#, it asserts a 'PE' signal through the signal bus S11. In response, the command generator 12 generates an appropriate "Write Output Delay Register" command packet.

The command generator 12 issues the appropriate command packet according to the received signals on S11 and S12, and sends the command information through signal bus, S13, and CSO, Qn ports.

Figure 2:
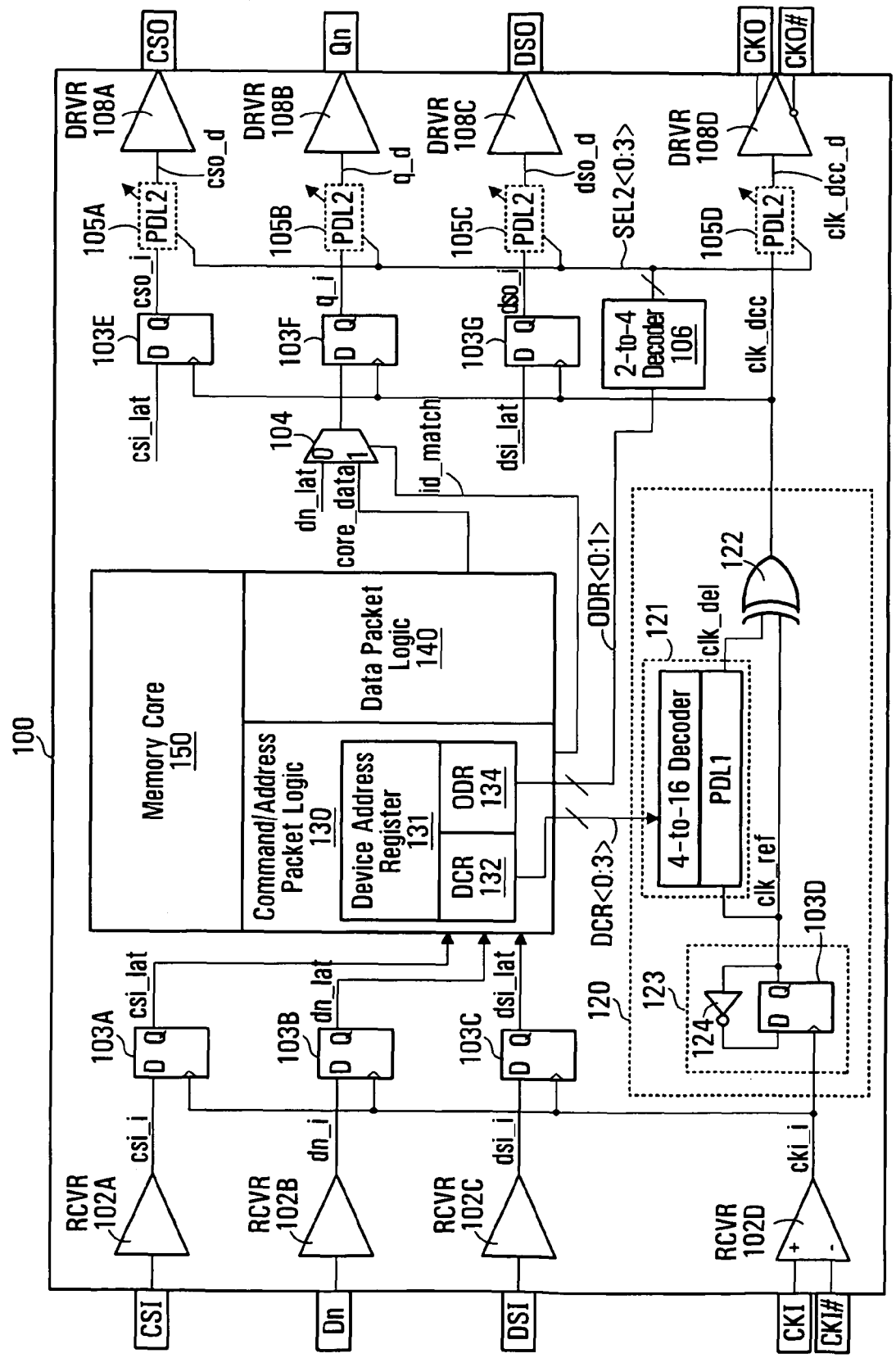
FIG. 2 is a block diagram of a memory device having controller programmable duty cycle correction scheme.

Referring now to FIG. 2, shown is a block diagram of an exemplary implementation of the memory devices 100-1 to 100-8 of FIG. 1. The device, generally indicated at 100, includes a memory core 150, command/address packet logic 130, data packet logic 140, and duty cycle correction logic 120. Memory core 150 may be a single bank of memory cell arrays or it could be multiple banks of memory cell arrays, depending on design variations. Data packet logic 140 processes and stores all necessary data transferring information. Command/address packet logic 130 processes all command instructions and/or address information coming through internal signals, 'dn_lat', according to an internal control signal 'csi_lat' as detailed below.

Clock Input Processing

The device 100 includes clock input receiver 102D for CKI/CKI# which may for example be a differential type input buffer to handle the differential clock inputs, CKI & CKI#. The clock input receiver 102D translates the external interface levels of CKI/CKI# signals to the internal logic levels of an internal clock signal 'cki_i'. The internal clock signal, cki_i, may be used in other internal logic blocks for various operations. As will be described in detail below, the duty cycle correction logic 120 takes the internal clock signal, cki_i, and produces a duty cycle corrected clock signal clk_dcc. The duty cycle corrected clock signal, 'clk_dcc', is delayed by a controller programmable delay line, PDL2, 105D, and its delayed signal, 'clk_dcc_d', is finally driven to the input port of an output driver block 108D, which outputs the external clock output signals, CKO/CKO#.

Command Strobe Input Processing

The device 100 includes command strobe receiver 102A which generates a buffered signal 'csi_i' from a CSI input signal. The buffered signal, csi_i, is connected to the D port of a D-type flip-flop 103A. The flip-flop 103A is driven by the clock signal, 'cki_i', and latches the status of the 'csi_i' signal at every rising edge of 'cki_i'. The latched signal 'csi_lat' is provided to the command/address packet logic 130, and also is provided to the D port of another flip-flop 103E, whose clock input port is driven by the duty corrected clock signal, clk_dcc. The flip-flop 103E's output signal, 'cso_i', is delayed by a controller programmable delay line, PDL2, 105A, and its delayed signal, 'cso_d', is finally driven to the input port of an output driver block 108A, which then outputs the external signal, CSO. Two stages of flip-flop logic 103A and 103E provide an input to output latency (=tIOL) of two clock cycles for CSI to CSO bypassing.

Data Strobe Input Processing

The device 100 includes data strobe input receiver 102C which generates a buffered signal 'dsi_i' from a DSI input signal. The buffered signal, dsi_i, is connected to D port of D-type flip-flop 103C. The flip-flop 103C is driven by the clock signal, 'cki_i', and latches the status of the 'dsi_i' signal at every rising edge of 'cki_i'. The latched signal 'dsi_lat' is provided to the command/address packet logic 130 and data packet logic 140, and also is provided to D port of another flip-flop 103G, whose clock input port is driven by the duty corrected clock signal, clk_dcc. The flip-flop 103G's output signal, 'dso_i', is delayed by a controller programmable delay line, PDL2, 105C, and its delayed signal, 'dso_d', is finally driven to the input port of an output driver block 108C, which outputs the external signal, DSO. Two stages of flip-flop logic 103C and 103G provides the same input to output latency (=tIOL) of two clock cycles for DSI to DSO bypassing.

Data Processing

The device 100 includes a data receiver, 102B, for receiving an external signal Dn. It is noted that the number of receivers 102B can be one or more than one according to the bit width of Dn ports. For example, if Dn ports are designated in D0, D1,~D7, for an 8 bit wide data input/output implementation, the receiver 102B will be repeated eight times. The output of the receiver 102B, 'dn_i', is provided to the D port of a D-type flip-flop 103B. The flip-flop 103B is driven by the clock signal, 'cki_i', and latches the status of the 'dn_i' signal at every rising edge of 'cki_i'. The latched signal 'dn_lat' is provided to the command/address packet logic 130 and also is provided to data packet logic 140. The latched signal, 'dn_lat' is also provided to one input port of a multiplexer 104. The other port of the multiplexer 104 is driven by a signal, 'core_data' from the data packet logic 140. The output of the multiplexer 104 is connected to the D input port of a flip-flop 103F, whose clock input port is driven by the duty corrected clock signal, clk_dcc, and latches the status of the output of the multiplexer 104 at every rising edge of 'clk_dcc'. The latched signal, 'q_i', is delayed by another controller programmable delay line, PDL2, 105B, and its delayed signal, 'q_d', is finally driven to the input port of an output driver block 108B, which outputs the external signal, Qn. Two stages of flip-flop logic 103B and 103F provides the same input to output latency (=tIOL) of two clock cycles for Dn to Qn bypassing.

The internal signal dn_i includes both command content (as delineated by the command strobe input) and data input (as delineated by the data strobe input) when present. Each device has a device address, in some embodiments stored in a device address register 131. Each command includes a Device Address portion that contains the device address of one of the memory devices to which the command is addressed. There may also be a broadcast address that requires the command to be processed by all devices. The memory device 100 processes each command by examining the Device Address portion. If the Device Address information in the received command/address packet matches the memory device 100's own stored device address, the command/address packet logic 130 processes the command, and also issues an "id_match" signal to signify that the command is for that memory device. The id_match signal is used to steer the data flow path of the multiplexer 104. If "id_match" is in a HIGH logic state (more generally in a "match state" however that is defined) as a result of device address matching process, the multiplexer 104 selects "core_data" to be outputted, so that the data from the memory core 150 can be transferred to the flip-flop 103F. On the other hand, if "id_match" is in a LOW logic state (more generally in a "no match state" however that is defined) as a result of device address matching process, the multiplexer 104 selects "dn_lat" to be outputted, so that the data received from the data input Dn can be transferred to the flip-flop 103F to be echoed at the output Qn.

Thus, the multiplexer 104 allows for the selection between a) bypassing data received from the data input Dn by selecting the dn_lat input of the multiplexer 104, and b) outputting the core_data by selecting the core_data input of the multiplexer 104. The signal 'core_data' is usually transferred from the memory core 150 to the data packet logic 140, for example as part of a 'PAGE READ' operation upon request from the memory controller 10. Then after the 'PAGE READ' operation is done, the memory controller 10 can request a 'BURST READ' operation to the memory device with a command addressed to that memory device. In that case, the memory device processes the 'BURST READ' command and the corresponding address information including Device Address portion. If the Device Address information in the received command/address packet matches the memory device 100's own stored device address, the command/address packet logic 130 issues "id_match" signal in order to steer the data flow path of the multiplexer 104. If "id_match" is in a HIGH logic state as a result of device address matching process, the multiplexer 104 selects "core_data" to be outputted, so that the data previously transferred from the memory core 150 to the data packet logic 140 can be transferred to the flip-flop 103F.

Note that in the case that a command is addressed to the memory device, but the command is not a BURST READ command, in some embodiments the core_data input of the multiplexer 104 is still selected even though there is no data to output. The core_data signal may be a static signal in such a case. This results in the data input Dn not being echoed to the next device. This can have the effect of reducing power consumption in the subsequent devices by eliminating the need for them to process data associated with commands that are not addressed to them. This is described in further detail in U.S. application Ser. No. 12/018,272 filed Jan. 23, 2008 entitled "Semiconductor Device and Method for Reducing Power Consumption in a System Having Interconnected Devices".

Thus, in some embodiments, a delayed version of the data input signal Dn is produced as one component of a data output signal (Qn). Some of the time the data output signal is the delayed version of the data input signal. For the implementation described, this will be the case when there is content on the data input signal that is not for the particular memory device but other scenarios are possible. Furthermore, some of the time the data output signal comprises a delayed version of a signal produced locally to the memory device, after applying the delay to the signal produced locally to the memory device in accordance with the command. For the implementation described, the signal produced locally to the memory device is the so-called core_data output from the data packet logic 140 but other scenarios are possible.

The command/address packet logic 130 has a DCR (duty cycle correction register) 132 that produces an output DCR<0:3> to the duty cycle correction circuit 120 to control the amount of duty cycle correction performed as detailed below and has an ODR (output delay register) 134 that produces an output ODR<0:1> to the packet delay lines 105A, 105B, 105C, 105D to control the amount of output delay applied as detailed below. One of the available commands is a "Write Duty Cycle Correction Register" command for writing a value to the DCR 132. Similarly, one of the available commands is a "Write Output Delay Register" command for writing a value to the ODR 134.

Write Duty Cycle Correction Register Command

The use of a "Write Duty Cycle Correction Register" command assumes an implementation, as described herein, in which an amount of delay to be applied in performing duty cycle correction is controlled by writing a value to a duty cycle correction register. More generally, any command, referred to herein as a duty cycle correction command, may be employed that has the effect of causing a device to set how duty cycle correction is to be performed. Thus, the described "Write Duty Cycle Correction Register" command is to be considered a specific example of a duty cycle correction command.

Write Output Delay Register Command

The use of a "Write Output Delay Register" command assumes an implementation, as described, in which an amount of delay to be applied is controlled by writing a value to an output delay register. More generally, any command, referred to herein as an output delay adjustment command, may be employed that has the effect of causing a device to set the amount of delay to be applied. Thus, the described "Write Output Delay Register" command is to be considered a specific example of an output delay adjustment command.

Duty Cycle Correction

In the illustrated example, the duty cycle correction circuit 120 includes a clock divider 123, and a controller programmable delay line 121 that includes a '4-to-16 Decoder' block and 'Programmable Delay Line (PDL1)'. Respective outputs clk_ref, clk_del of the clock divider 123 and the controller programmable delay line 121 are input to an XOR gate 122 the output of which is the duty cycle corrected clock clk_dcc.

The clock divider 123 derives an output signal 'clk_ref' which has a frequency that is one half that of the input 'cki_i' signal. Clock divider circuits are well known in the art. In the particular example illustrated, the clock divider 123 includes a D-type flip-flop 103D that is driven by the internal clock signal, cki_i, through its clock input port. The output port Q of the D-type Flip-Flop 103D is connected to the input port D though inverter logic 124 in order to obtain a half frequency output signal.

The controller programmable delay line 121 produces an output signal, clk_del, which is a delayed version of clk_ref. The amount of delay is determined by the '4-to-16 Decoder' logic block's select signals, which are controlled by DCR<0:3> signal information received from command/address packet logic 130. The XOR logic gate 122 receives the two half clock signals, clk_ref and clk_del, and outputs a duty cycle adjusted full clock signal, clk_dcc.

Figure 3:
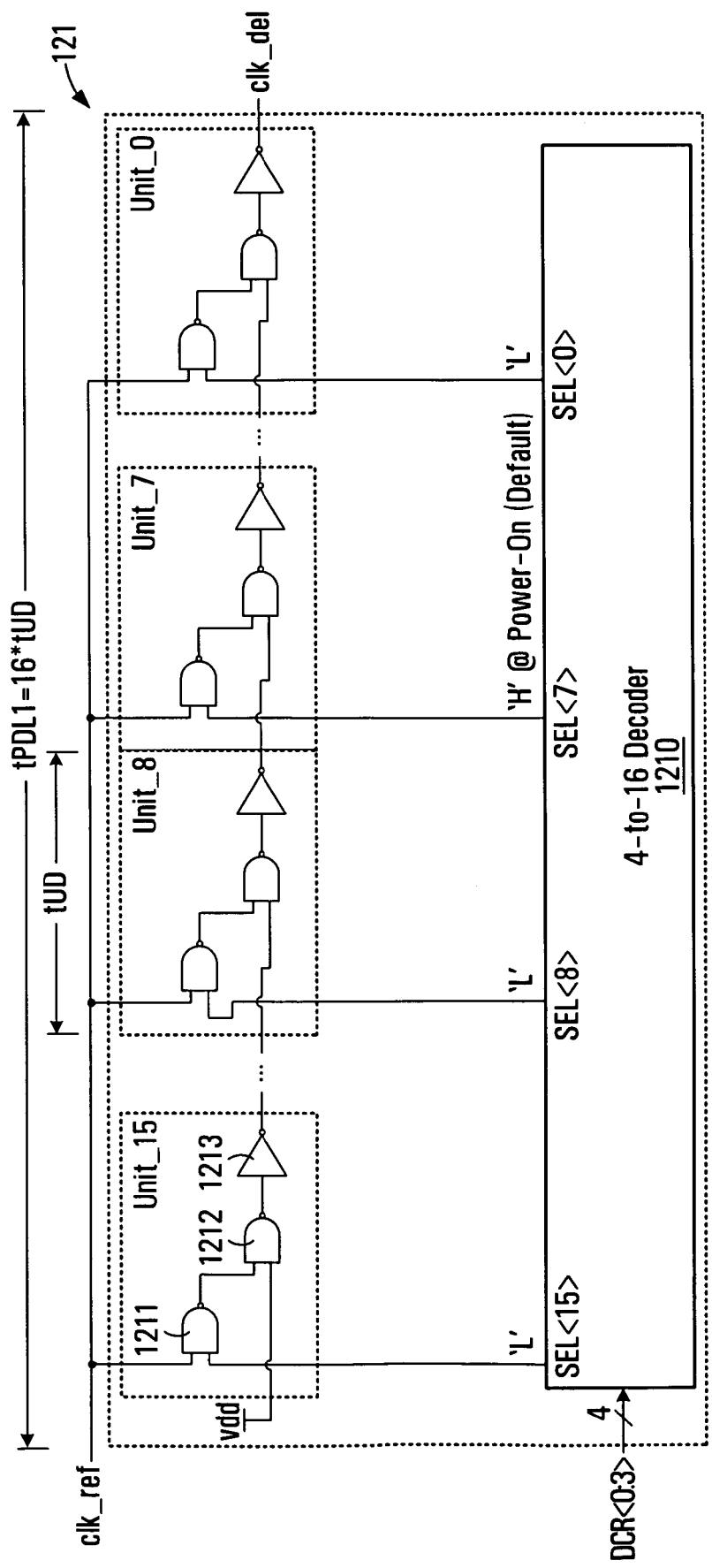
FIG. 3 is a block diagram of a programmable delay line for duty cycle correction.

FIG. 3 is a block diagram of an example implementation of a programmable delay line 121 for duty cycle correction that may, for example, be used in the duty cycle correction circuit 120 of FIG. 2. The half frequency clock signal, clk_ref, is driven to respective inputs of each of 16 unit delay blocks UNIT_0~UNIT_15. Each unit delay block has an identical structure, and unit delay block UNIT_15 will be described by way of example. The unit delay block is composed of two NAND logic gates 1211 and 1212 and one inverter logic gate 1213. The first NAND logic gate 1211 receives the clk_ref input at its first input, and receives an output from a 4-to-16 decoder 1210 at its second input. The output of the first NAND logic gate 1211 is input to a first input of the second logic NAND gate 1212. For unit delay block UNIT_15, the second input of the second logic NAND gate 1212 is connected to Vdd. For all unit delay blocks except the right most unit delay block, UNIT_0, the output of the second NAND gate 1212 is connected through the inverter 1213 to the second input of the second NAND gate 1212 in the next unit delay block. The output of the second NAND gate of the right most unit delay block UNIT_0 is connected through an inverter and produces the overall output clock clk_del signal. The 4-to-16 Decoder block 1210 has a 4-bits wide input bus, DCR<0:3> as its input. The decoder block 1210 decodes the input and outputs a 16-bit wide bus, SEL<15:0>, with one line of the bus connected to each of the 16 unit delay blocks. The unit delay logic shown is an example of a known circuit technique has been used to produce a register controlled delay-locked-loop. Other unit delay logics can alternatively be employed. The use of 16 unit delay blocks is implementation specific. For example, more generally, an N-to-M decoder might be employed to decode signals received on N input lines into M control signals for M unit delay blocks, where N>=1 and M>=2.

In operation, the '4-to-16 Decoder' logic 1210, produces the 16 SEL<15:0> output such that only one of the 16 select signals is in a HIGH logic state and all the other 15 select signals are in LOW logic states. Therefore, only one unit delay block is selected to transfer the 'clk_ref' signal through the unit delay blocks that are to the right of the selected unit delay block. The control input DCR<0:3> is used to select which of the unit delay blocks will process the clk_ref input.

The minimum delay is selected by selecting the right most unit delay block UNIT_0 in which case the clk_del is the clk_ref signal delayed by one unit delay block, whereas the maximum delay is selected by selecting the left most unit delay block UNIT_15 in which case the clk_del is the clk_ref signal delayed by all 16 unit delay blocks.

For most process technologies, the unit delay amount of the illustrated unit delay block is around 100 ps~150 ps. However, in some embodiments, a finer unit delay circuit block is employed for much higher operating frequency with finer delay tuning capability. The unit delay time is denoted as "tUD" in FIG. 3 and the total delay time for the whole programmable delay line is denoted as "tPDL1" which is 16 times "tUD".

In some embodiments, a default setting for the power-on initialization is that having a logic HIGH state on the SEL<7> bit, as it is in the middle position of the delay line. However, in other design variations, the default settings can be different, and it may be recommended to have minimum delay setting in order to be ready for operating at the maximum frequency.

Figure 4:
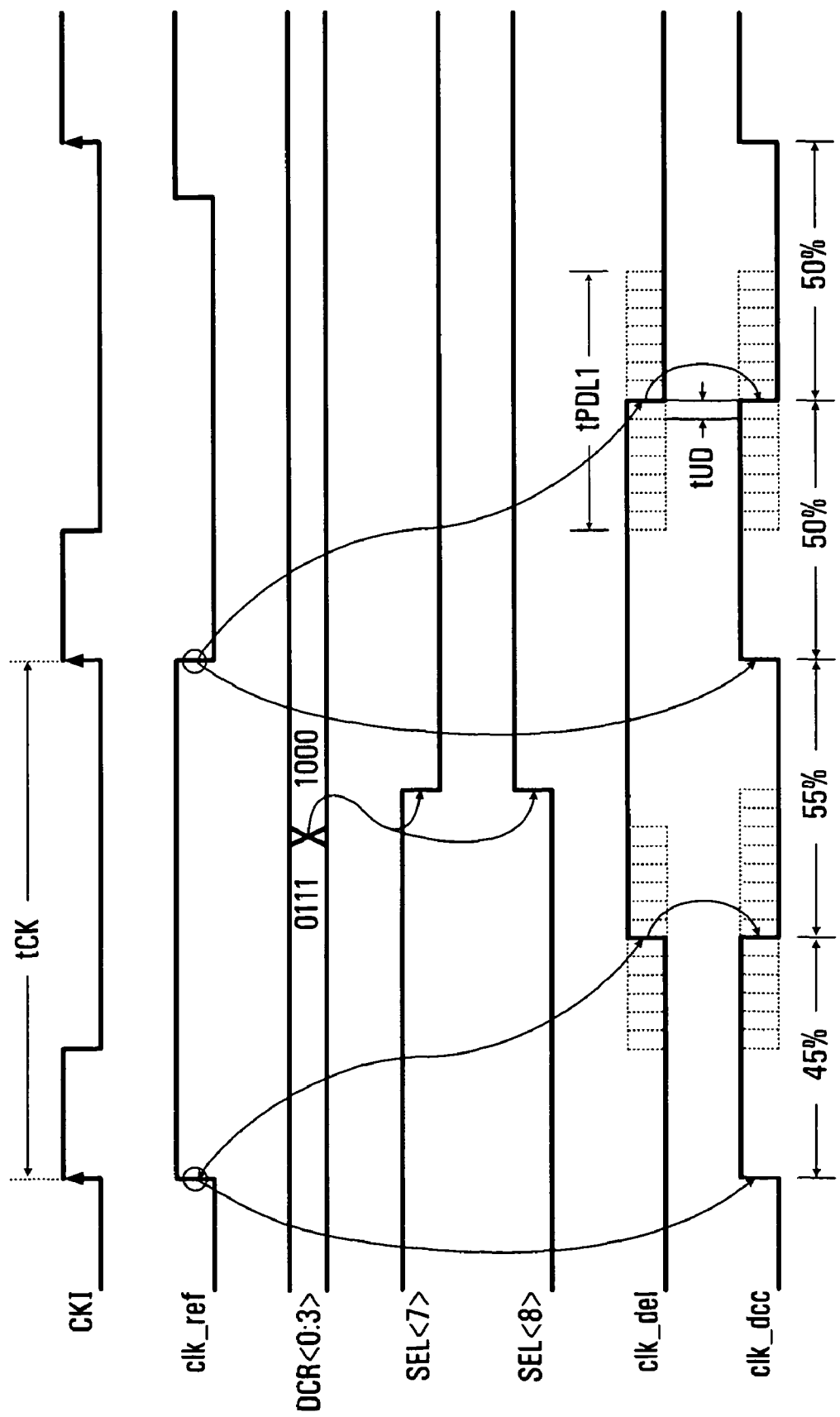
FIG. 4 is a timing diagram of controller programmable duty cycle correction.

FIG. 4 is an example of a timing diagram of the controller programmable duty cycle correction procedure, where all of the signals are as shown in FIG. 3 except CKI which is the raw input clock signal that is to be duty corrected. The timing diagram is showing one extremely distorted clock input signal, CKI at the top, for the sake of example only. The half clock signal, clk_ref, is derived from the 'clock divider' block 123 of FIG. 2 and its rising and failing edges are aligned with two rising edges of CKI. It is assumed for this example that the clock signal, clk_dcc, would have a distorted duty ratio, such as 45% on, 55% off, for example, in the absence of any change to the DCR<0:3> values which are shown to initially be set to "0111b". After DCR<0:3> values are changed to "1000b", the duty cycle of the clock signal, clk_dcc, is corrected to be 50% on and 50% off as the result of a shift in the selection of the controller programmable delay line 121 from SEL (7) being enabled to SEL (8) being enabled.

Control of the Duty Cycle Correction

Recall that the contents of the DCR 132 are used to control the amount of delay introduced by the controller programmable delay line 121 in the duty cycle correction circuit 120, thereby controlling the duty cycle correction. As described above, the contents of the DCR 132 can be written with a 'Write Duty Cycle Register' command.

Figure 5:
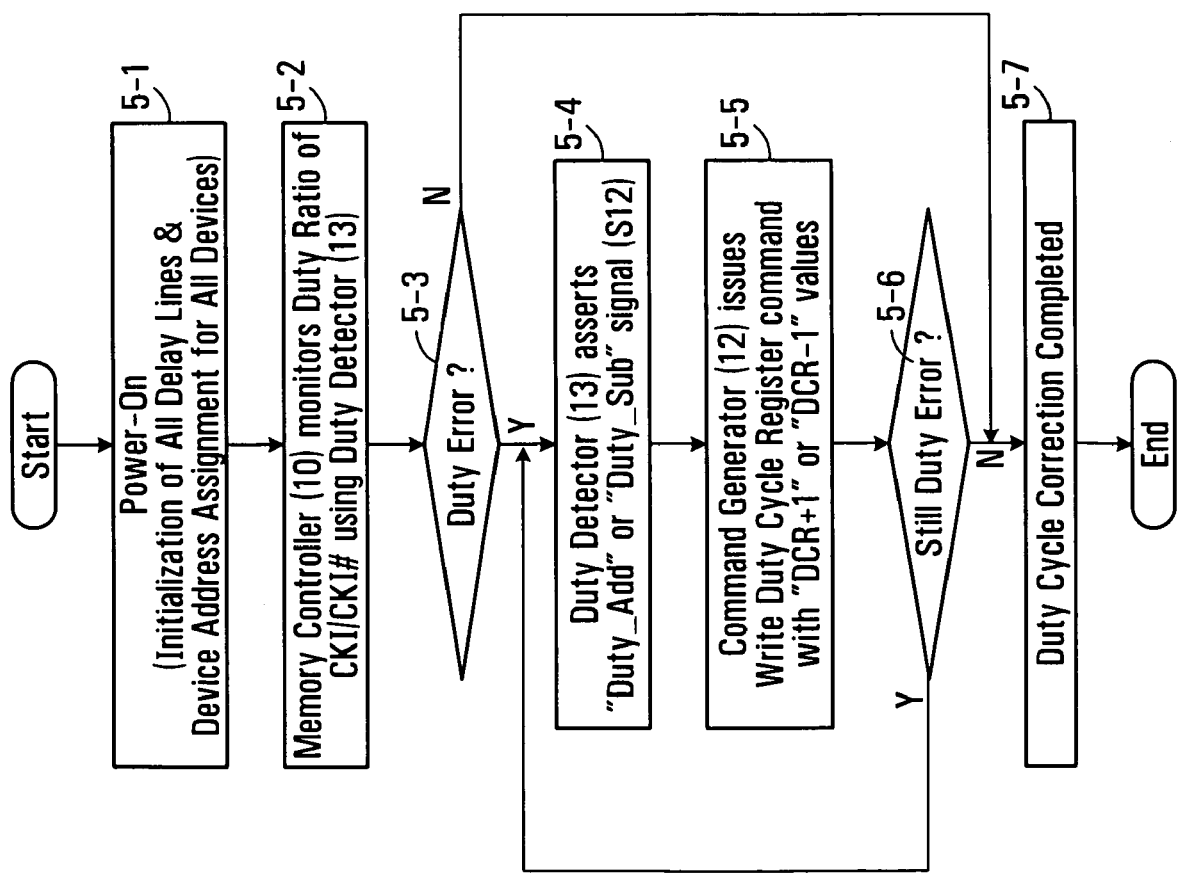
FIG. 5 is a flowchart of a method of duty cycle correction.

FIG. 5 is a flow chart for the duty cycle correction procedure from the perspective of the controller. The method begins at block 5-1 with power on of the devices. At this point, all of the delay lines are initialized and device addresses for all devices are assigned. At block 5-2, the memory controller 10 monitors the duty ratio of CKI/CKI# using the duty detector 13. If there is a duty cycle error, yes path block 5-3, then in block 5-4 the duty detector 13 asserts the "Duty_Add" or the "Duty_Sub" signal S12. After this, the command generator 12 issues the 'Write Duty Cycle Register' command with "DCR+1" or "DCR−1" values. If there is still a duty cycle error, yes path block 5-6, then the method continues back at step 5-4 with the further adjustment to the duty cycle register. If there is no longer a duty cycle error, no path block 5-6, then duty cycle correction is completed at 5-7. Similarly, if no duty cycle error was detected in block 5-3, then at that point the method also is completed at 5-7.

Table 1 below is an example command packet definition for writing to the Duty Cycle Register (DCR). The first byte is 'Device Address (=DA)' portion and the second byte is a Command code (=CMD=FAh), and the third byte contains Register Values (=DCR<0:3>). In some embodiments, a broadcast address is provided, for example FFh. If DA is set to the broadcast address, it means that the command is a broadcasting command, so that every memory device is expected to execute the command. Otherwise, only a specific memory device that is matching the DA will execute the command. In some embodiments, a 'Read Duty Cycle Register' command is also implemented in order to give more flexibility to the controller 10.

TABLE 1

Exemplary Command Packet Definition for Duty Cycle Register

| Command | $1^{st}$ Byte | $2^{nd}$ Byte | $3^{rd}$ Byte |
|---|---|---|---|
| Write Duty Cycle Register (DCR) | DA | FAh | DCR<0:3> |

*Notes:
1) if DA (Device Address) is FFh(=255d), it is a broadcasting command so that every device will respond to the command.
2) DA = Device Address.

Table 2 is an example bit definition of Duty Cycle Register (=DCR). It is showing purely example definitions, therefore if the system configuration requires more detailed granularity for the unit delay adjustment, this table can be easily expanded in order to accommodate more manageability in terms of programmable delay lines. For example, if Bit<7:0> is entered as "0000 1000b=08h" from the controller, DCR<3:0> will be accepting only Bit<3:0> (="1000b") for valid register values and upper four bits Bit<7:4> will be ignored. In other design variations, however, a finer unit delay circuit can be implemented for higher frequency operation, and additional bit assignments may be used.

TABLE 2

Exemplary Bit Definition of Duty Cycle Register & Output Delay Register

| Description | Bit 7 | Bit 6 | Bit 5 | Bit 4 | Bit 3 | Bit 2 | Bit 1 | Bit 0 |
|---|---|---|---|---|---|---|---|---|
| Duty Cycle Register Bits | Reserved For Future Use (Low) | | | | DCR<3> | DCR<2> | DCR<1> | DCR<0> |

Figure 6:
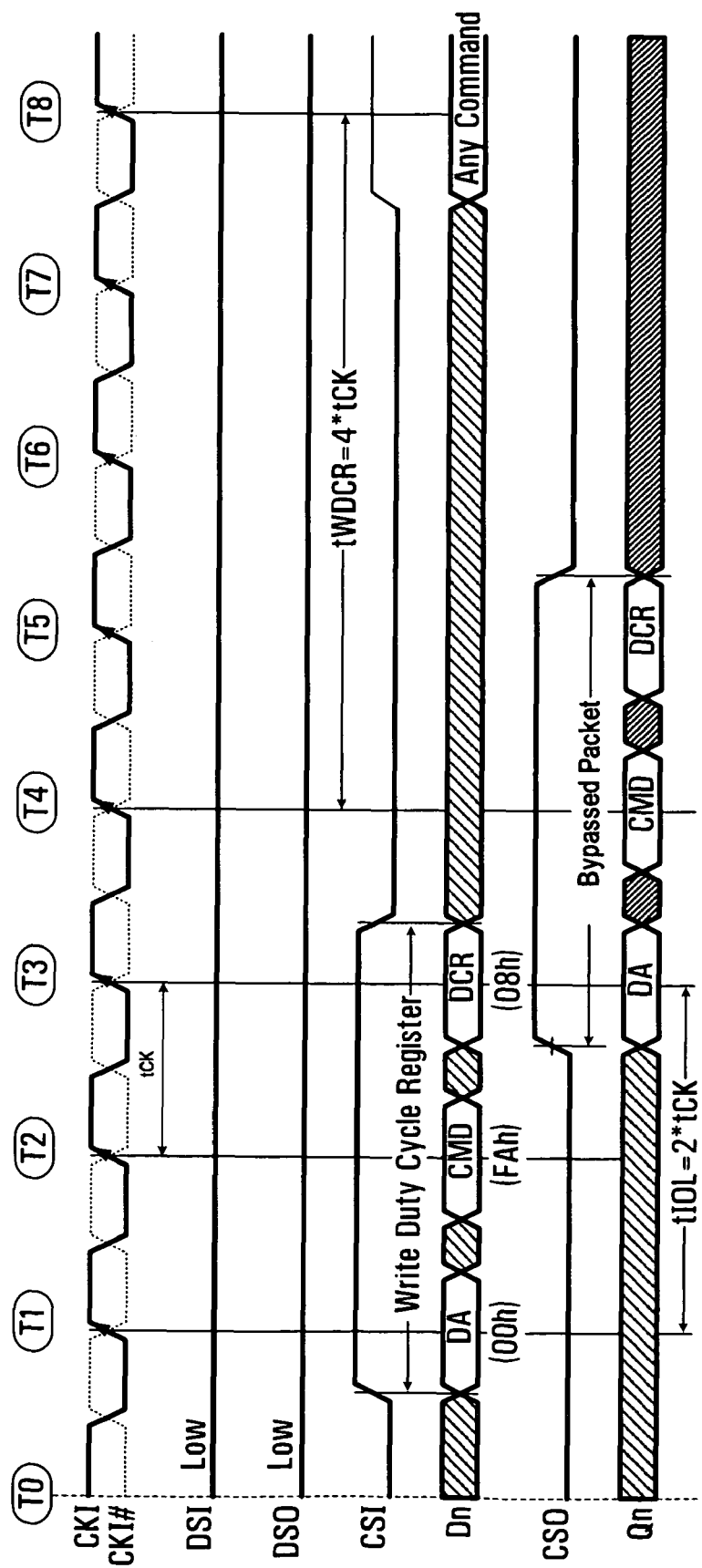
FIG. 6 is a timing diagram for a write duty cycle register command.

FIG. 6 is an example of a timing diagram of a 'Write Duty Cycle Register' command packet sequence based on SDR (Single Data Rate) operation. In this timing diagram, at time T1, the rising edge of CKI or the failing edge of CKI# latches the HIGH state of CSI and simultaneously latches DA (=Device Address=00h) information on Dn port(s). If DA is set as FFh (=255 in decimal), this means that the 'Write Duty Cycle Register' command is a broadcasting command, so that every memory device is expected to execute the command. In some embodiments, the broadcasting command is used for Duty Cycle Correction operation. However, the circuit disclosed also allows for the more flexible adjustment of duty cycle correction operations within individual devices. In the next rising edge time T2, the memory device latches CMD (=Command=FAh) information, and on the third rising edge T3, DCR (=Duty Cycle Register Value=08h) information. The CSO output and Qn output ports echo the CSI input and Dn input signals, respectively, with two clock latency of tIOL (=Input-to-Output Latency). There is another latency specification which is tWDCR (=Write Duty Cycle Register Latency), and it is for the processing time of the Write Duty Cycle Register packet in the memory chip and for the processing time of Duty Cycle adjustment in the Controller Programmable Delay Line 121 within the duty cycle correction circuit 120. In some embodiments, tWDCR value is set as 4 clock cycles as shown in FIG. 6. After tWDCR (for example, at T8), the memory controller 10 can issue any other command packet to the memory device.

The embodiments described assume that all of the devices in the serial-connected architecture implement duty cycle correction. More generally, at least one of the devices implement duty cycle correction.

Output Delay Adjustment

Referring again to FIG. 1, the described programmable delay lines 105A, 105B, 105C, 105D are provided to allow programmably delaying the output signals CSO, Qn, DSO and CKO/CKO# in order to allow phase correction. FIG. 1 also shows output delay register signal buses ODR<0:1> connected to a 2-to-4 Decoder logic block 106. The 2-to-4 Decoder logic 106 outputs four select signal buses, SEL2<0:3>. Those SEL2<0:3> select signals are all connected to the four controller programmable delay lines 105A, 105B, 105C and 105D.

Figure 7:
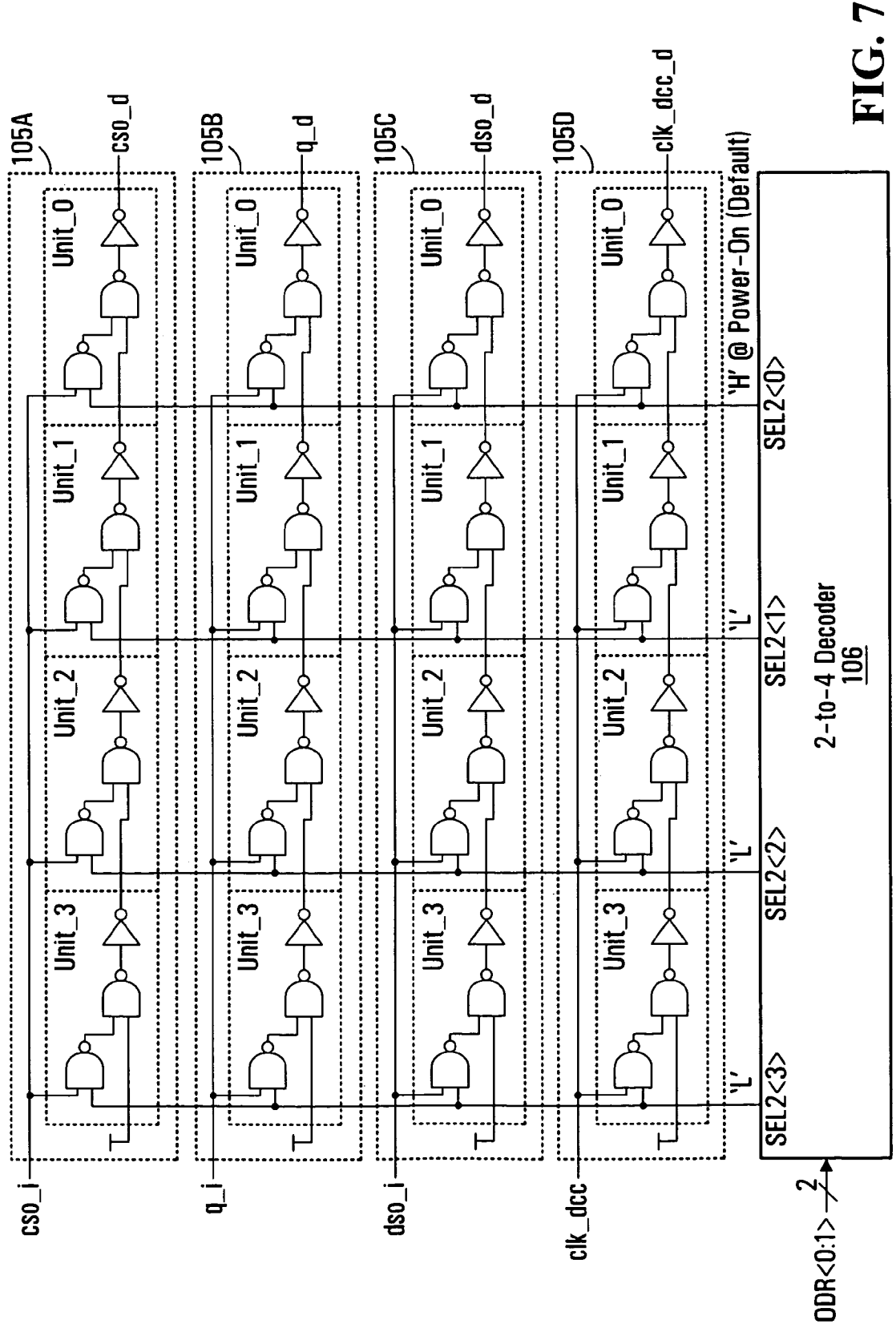
FIG. 7 is a block diagram of a programmable delay line for output delay adjustment.

FIG. 7 is showing an exemplary circuit block implementation for the output delay adjustment. In the illustrated example, programmable delay lines 105A, 105B, 105C and 105D are composed of four unit delay elements that are the same as those used in FIG. 3. This means that the range of delay adjustment for the output is only 4/16 that of the range of delay of adjustment of the duty cycle. However, this is an implementation detail, and other numbers of delay elements may alternatively be employed. Each programmable delay line 105A, 105B, 105C, 105D receives a respective signal cso_i, q_i, dso_i and clk_dcc, as the input of the delay line and produces a respective delayed output cso_d, q_d, dso_d and clk_dcc_d. If the memory system has a multi-bit output configuration, for example an 8-bit wide I/O configuration, q_i and q_d, signals will be increased correspondingly, for example to be 8 in number, and the number of delay line blocks for q_i and q_d, will be increased correspondingly, for example to be 8 in number.

In operation, the '2-to-4 Decoder' logic 106, produces the SEL2<0:3> output such that only one of the 4 select signals is in a HIGH logic state and all the other 3 select signals are to be logic LOW states. Only the selected unit delay block transfers the respective input signal through the remaining unit delay blocks to the right of the selected unit delay block. The control input ODR<0:1> is used to select which of the unit delay blocks will process the respective inputs. The minimum delay is selected by selecting the right most unit delay block UNIT_0 in which case each output signal is the respective input signal delayed by one unit delay block, whereas the maximum delay is selected by selecting the left most unit delay block UNIT_3 in which case each output signal is the respective input signal delayed by four delay unit blocks.

The '2-to-4 decoder' logic 106 with four unit delay blocks is implemented in this example circuit design. However more generally, any required number of delay units and the corresponding decoder logic may be used. A default delay setting may be used during the power-on initialization period. In this example, the default selection might for example be set to SEL2<0>, and the memory device will have the least amount of delay for each output path after power-on or hard reset in some other design variations. The use of 4 unit delay blocks is implementation specific. For example, more generally, an N-to-M decoder might be employed to decode signals received on N input lines into M control signals for M unit delay blocks, where N>=1 and M>=2.

Figure 8:
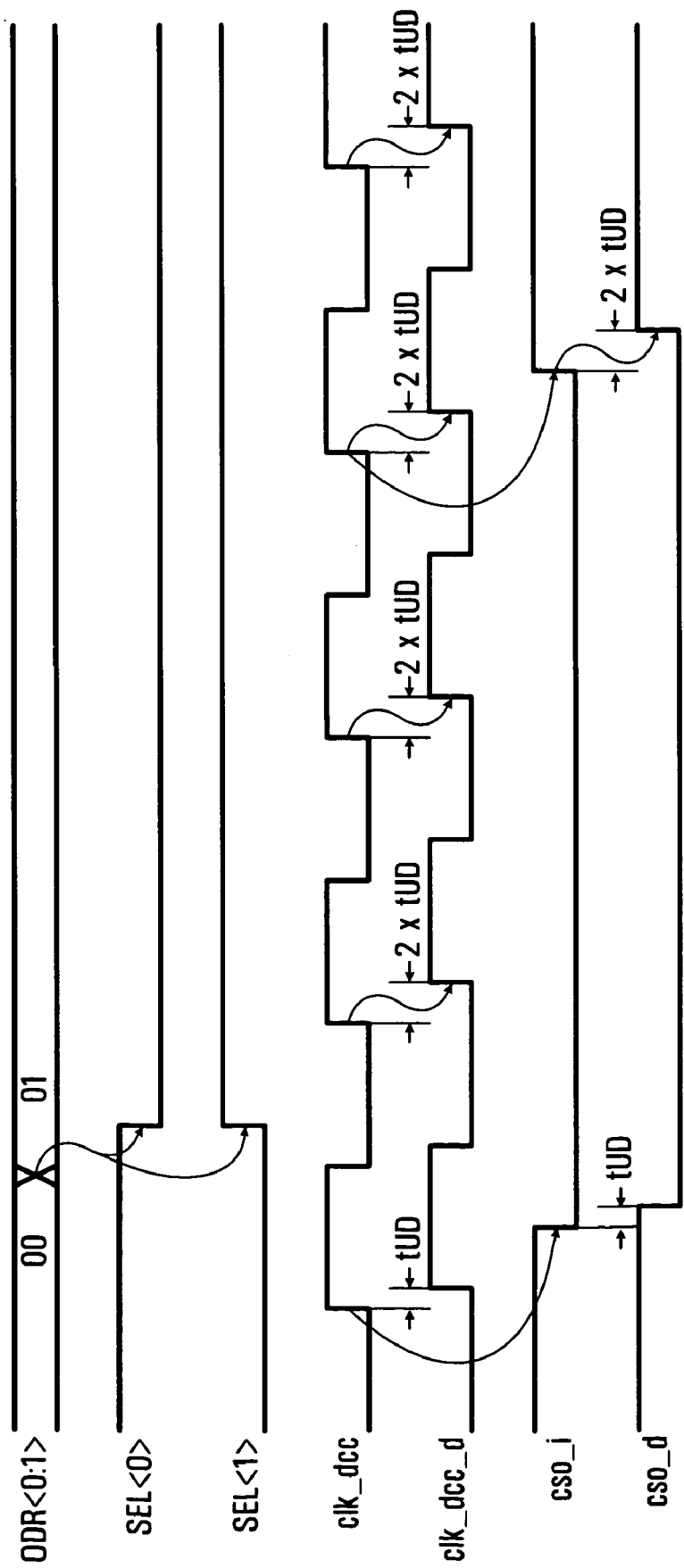
FIG. 8 is a timing diagram of controller programmable output delay adjustment.

FIG. 8 is an example timing diagram for controller programmable output delay adjustment. Shown is a duty cycle corrected clock clk_dcc, and the delayed version of that clk_dcc_d before and after a change in the contents of the output delay register. It can be seen that after the change in the output delay register from the value "00b=0d" to "01b=1d", the delayed clock is delayed by an amount 2×tUD whereas before the adjustment it had been delayed by 1×tUD. Also shown is the command strobe output cso_i before output after the delay adjustment, and the output of the delay adjustment which is cso_d. Once again, before the change to the output delay register, the delayed command strobe is later by 1×tUD. After the change to the output delay register, the delayed command strobe is later by an amount 2×tUD.

Control of Output Delay Adjustment

Recall that the contents of the ODR 134 are used to control the amount of delay introduced by the delay lines 105A, 105B, 105C, 105D thereby controlling the amount of output delay adjustment. As described above, the contents of the ODR 134 can be written with a 'Write Output Delay Register' command.

When the phase detector 11 in the memory controller 10 detects an unacceptable phase difference between its CKI/CKI# and CKO/CKO# signals, the controller 10 will issue one "Write Output Delay Register" command packet with one added unit delay amount to allow the very first memory device 100-1 of FIG. 1. After enough clock cycles for a first memory device, for example for the tWODR (Write Output Delay Register latency) and total tIOL latencies described below with respect to FIG. 10, if there is still unacceptable phase difference, the controller 10 can issue another "Write Output Delay Register" command packet to a second memory device, for example the second memory device 100-2 of FIG. 1. This sequence of operations can be continued until the memory controller 10 gets the acceptable phase difference. After the last memory device is instructed to adjust its output delays, then the memory controller 10 points to the very first memory device with one more added unit delay value within the command packet, and continues for the rest of the memory devices until the phase difference reaches an acceptable range.

Figure 9:
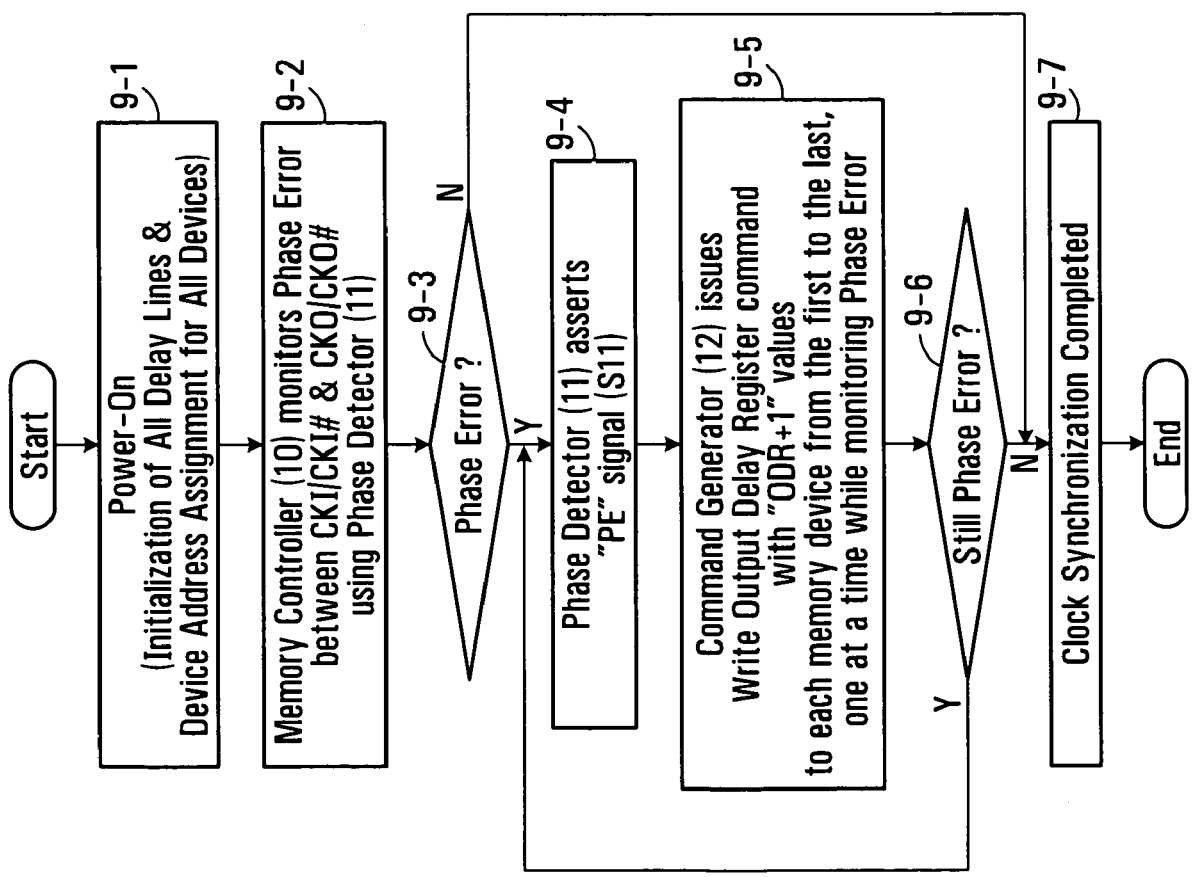
FIG. 9 is a flowchart of a method of performing output delay adjustment.

The above procedure is shown in the flowchart of FIG. 9. The method begins at block 9-1 with power on. At this point, all the delay lines and device addresses are initialized. In block 9-2, the memory controller 10 monitors the phase error between CKI/CKI# and CKO/CKO# using the phase detector 11. If there is a phase error, yes path 9-3, then the phase detector 11 asserts the "PE" signal S11 in block 9-4. After that, the command generator 12 issues a 'write output delay register' command with "ODR+1" value to each memory device from the first to the last, one at a time while monitoring the phase error. In block 9-6, if there is still a phase error, yes path, then the method continues back at block 9-4. If there is no phase error, no path block 9-6, then the phase correction is completed at block 9-7. Similarly, if no phase error was detected in block 9-3, then the method ends, phase correction having been completed at block 9-7.

Table 3 is an example command packet definition for the Write Output Delay Register command. The first byte is a 'Device Address (=DA)' portion and the second byte contains a Command code (=CMD=FBh), and the third byte contains Register Values (ODR<0:1>). In some embodiments, a broadcast address is provided, for example FFh. If DA is set to the broadcast address, it means that the command is a broadcasting command, so that every memory device is expected to execute the command. Otherwise, only a specific memory device that is matching with DA will execute the command. In some embodiments, a 'Read Output Delay Register' is implemented in order to give more flexibility to the controller 10. For example, this can be used by the controller to read the values from all of the memory devices and then rearrange the settings among the devices appropriately, if necessary.

TABLE 3

Exemplary Command Packet Definition for Controller Programmable Delay Line Registers

| Command | $1^{st}$ Byte | $2^{nd}$ Byte | $3^{rd}$ Byte |
|---|---|---|---|
| Write Output Delay Register (ODR) | DA | FBh | ODR<0:1> |

*Notes:
1) if DA (Device Address) is FFh(=255d), it is a broadcasting command so that every device will respond to the command.
2) DA = Device Address.

Table 4 is an example bit definition of Output Delay Register (=ODR). It is showing purely example definitions, therefore if the system configuration requires more detailed granularity for the unit delay adjustment, this table can be easily expanded in order to accommodate more manageability in terms of programmable delay lines.

TABLE 4

Exemplary Bit Definition of Duty Cycle Register & Output Delay Register

| Description | Bit 7 | Bit 6 | Bit 5 | Bit 4 | Bit 3 | Bit 2 | Bit 1 | Bit 0 |
|---|---|---|---|---|---|---|---|---|
| Output Delay Register Bits | Reserved For Future Use (Low) | | | | | | ODR<1> | ODR<0> |

Figure 10:
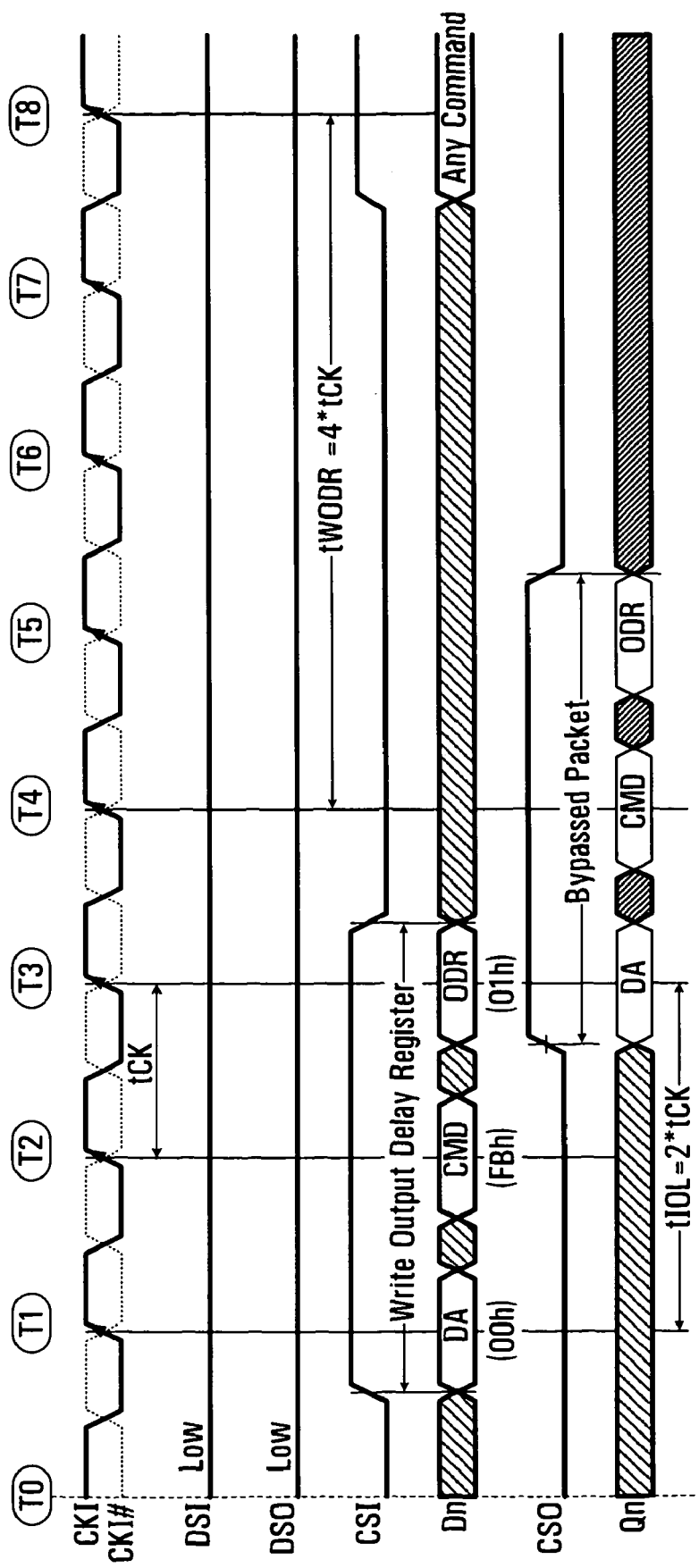
FIG. 10 is a timing diagram for a write output delay register command.

FIG. 10 is an example of a timing diagram of a 'Write Output Delay Register' command packet sequence based on SDR (Single Data Rate) operation. In this timing diagram, at time T1, the rising edge of CKI or the failing edge of CKI# latches the HIGH state of CSI and simultaneously latches DA (=Device Address=00h) information on Dn port(s). In the next rising edge time T2, the memory device latches CMD (=Command=FBh) information, and on the third rising edge, ODR (=Output Delay Register Value=01h) information. The CSO output and Qn output ports are echoing the CSI input and Dn input signals, respectively, with two clock latency of tIOL (=Input-to-Output Latency). There is another latency specification which is tWODR (=Write Output Delay Register Latency), and it is for the processing time of Write Output Delay Register packet in the memory chip and for the processing time of Output Delay adjustment in the Controller Programmable Delay Line 2 (=PDL2 105 A-D). In some embodiments, tWODR value is set as 4 clock cycles as shown in FIG. 10. After tWODR (for example, at T8), the memory controller 10 can issue any other command packets to the memory device.

More generally, an embodiment of the application provides for methods and circuits performing output delay adjustment embodiments in which, a delayed version of at least one input signal is produced, the at least one input signal includes at least the clock signal. There may be may be additional input signals conveyed between devices that are not subject to output delay adjustment. For some signals, generating a delayed version of an input signal for output involves conditionally generating a delayed version of the input signal for output. That is to say, some of the signals may be conditionally conveyed between adjacent devices. A specific example is detailed below in which the input data signal of a memory device is conveyed to the next memory device some of the time.

The embodiments described above have assumed the use of programmable delay lines that are composed of identical unit delay blocks. In some embodiments, the programmable delay lines are divided into two or more sections, such as "Coarse" and "Fine" delay lines to allow further programmability of the delay adjustment for duty cycle correction and/or output delay adjustment.

In the detailed examples described, there is a first Flip-Flop near the input, and a second Flip-Flop near the output for each signal. This is what produces the two clock cycle latency. Of course, it is to be understood that other clock latencies may result by including different functionality between the input and the output.

In the embodiments described, the output delay lines are located after the last Flip-Flop that is located near an output for each signal. In some embodiments, the output delay line is located before the last flip-flop.

In some embodiments, the devices that are connected in the serial-connected manner are assumed to be substantially identical. In some embodiments, these are substantially identical memory devices. In other embodiments, different types of memory devices can be utilized as along as they have compatible serial interfaces.

The detailed embodiments have assumed that differential clock signals are employed. More generally, single ended or differential clock signals may be used. Similarly, any other input/output signals can be single ended or differential.

In some embodiments, a single MCP (multi-chip package) is provided that includes the plurality of memory devices and a controller, operable as described.

The methods and apparatus described herein have assumed a serial-connected architecture featuring a controller and a set of memory devices connected in a ring. In such embodiments, the memory devices are slave devices, and the memory controller is a master device. More generally, the methods and apparatus described herein can be applied to any kind of semiconductor integrated circuit system having any kind of semiconductor integrated circuit devices that are configured as slave devices in the serial-connected configuration with a common interface between adjacent devices, with a device that is configured to act as a master device that controls the duty cycle correction and/or phase correction performed by the slave devices. Examples of integrated circuit types include central processing units, graphics processing units, display controller IC, disk drive IC, memory devices like NAND Flash EEPROM, NOR Flash EEPROM, AND Flash EEPROM, DiNOR Flash EEPROM, Serial Flash EEPROM, DRAM, SRAM, ROM, EPROM, FRAM, MRAM, PCRAM etc.

Some of the embodiments described herein have assumed single data rate operation. More generally, the embodiments can be applied to systems with other data rates, for example double rate operation with appropriate modifications that would be understood to a person skilled in the art upon reading this disclosure.

Numerous modifications and variations of the present invention are possible in light of the above teachings. It is therefore to be understood that within the scope of the appended claims, the invention may be practiced otherwise than as specifically described herein.

The invention claimed is:

1. A method in a slave device of a plurality of serial-connected slave devices, the method comprising:
   receiving a command from a master device specifying how the slave device is to adjust a delay to be applied to at least one input signal from the master device or a preceding serial-connected device to be output as at least one signal output by the slave device;
   receiving the at least one input signal from the master device or a preceding serial-connected device, the at least one input signal comprising at least an input clock signal;
   for each of the at least one input signal:
   generating a delayed version of the input signal in accordance with the command;
   outputting the delayed version of the input signal to the master device or a succeeding serial-connected device.

2. The method of claim 1 wherein the slave device is a memory device and the master device is a memory controller.

3. The method of claim 1 comprising:
   outputting a data output signal;
   wherein at least one of the input signals comprises a data input signal and wherein outputting the delayed version of the data input signal is performed as part of outputting the data output signal such that:
   a) some of the time the data output signal is said delayed version of the data input signal;
   b) some of the time the data output signal is a delayed version of a signal produced locally to the slave device, after applying the delay to the signal produced locally to the slave device in accordance with the command.

4. The method of claim 1 wherein receiving a command from a master device specifying an adjustment to a delay to be applied to at least one signal output by the slave device comprises receiving a command containing a command identifier that identifies the command as an output delay adjustment command, the command further containing data indicating how to adjust the delay.

5. The method of claim 4 wherein receiving a command further comprises receiving a device address indicating which device(s) acting as slave devices is to execute the command.

6. The method of claim 5 further comprising:
   performing the step of, for each of the at least one input signal, generating a delayed version of the input signal in accordance with the command if the command has a device address that matches a device address of the slave device;
   performing the step of, for each of the at least one input signal, generating a delayed version of the input signal in accordance with the command if the command has a device address that is a broadcast device address.

7. The method of claim 4 wherein:
   for each input signal, generating a delayed version of the input signal comprises:
   a) delaying the input signal by a selected one of a plurality of delays to produce the delayed version of the input signal.

8. The method of claim 7 wherein the data indicating how to adjust the delay comprises an indication of the selected one of the plurality of delays.

9. The method of claim 1 wherein the plurality of input signals comprise:
   a clock signal;
   a command strobe signal;
   a data strobe signal;
   a data signal containing commands and data.

10. A method in a memory system comprising a master device and a plurality of serial-connected device acting as slave devices comprising at least a first slave device and a last slave device, the method comprising:
    in the master device:
    a) outputting at least one output signal, the at least one output signal comprising a first clock signal to function as an input clock signal of the first slave device;
    b) receiving a second clock signal that is an output clock signal of the last slave device;
    c) determining an amount of phase offset between the first clock signal and the second clock signal;
    d) generating an output delay adjustment command as a function of the phase offset between the first clock signal and the second clock signal and outputting the output delay adjustment command.

11. The method of claim 10 wherein each slave device is a memory device and the master device is a memory controller.

12. The method of claim 10 further comprising:
    in the first slave device of the plurality of serial-connected device acting as slave devices:
    a) receiving the at least one output signal from the master device as corresponding at least one input signal of the first slave device;
    b) for each input signal, generating an output signal based on the input signal;
    in each other slave device of the plurality of serial-connected device acting as slave devices:
    a) receiving output signal(s) of a preceding slave device corresponding to at least one input signal of the slave device;
    b) for each input signal, generating an output signal based on the input signal;
    in at least one of the slave devices,
    a) receiving the output delay adjustment command; and
    b) generating the output signal(s) by generating a delayed version of the input signal(s) in accordance with the output delay adjustment command.

13. The method of claim 12 further comprising:
    wherein the at least one output signal of the master device comprises a plurality of output signal(s).

14. The method of claim 10 wherein generating a delay adjustment command comprises generating a delay adjustment command for execution by a specified one of the plurality of serial-connected slave devices.

15. The method of claim 10 wherein generating a delay adjustment command comprises generating a delay adjustment command for execution by all of the plurality of serial-connected slave devices.

16. The method of claim 12 wherein generating a delayed version of the input signal(s) in accordance with the output delay adjustment command comprises generating a delayed version of the input signals(s) delayed by a selected one of a plurality of delays.

17. The method of claim 16 wherein generating a delay adjustment command comprises generating a command containing a command identifier that identifies the command as an output delay adjustment command, and containing data indicating how to adjust the delay.

18. The method of claim 17 wherein the data indicating how to adjust the delay comprises an indication of the selected one of the plurality of delays.

19. The method of claim 10 further comprising:
    the master device outputting output delay adjustment commands that adjust delay by adding a delay one unit delay element in one slave device at a time until the phase offset is acceptable.

20. The method of claim 10 wherein the plurality of input signals comprise:
- a clock signal;
- a command strobe signal;
- a data strobe signal;
- a data signal containing commands and data.

21. A slave device for use in an arrangement comprising a plurality of serial-connected slave devices, the slave device comprising:
- a command input for receiving a command from a master device specifying how to perform output delay adjustment;
- a clock input for receiving an input clock signal from the master device or a preceding serial-connected device;
- an output delay adjustment circuit for generating a delayed clock signal from the clock input in accordance with the command;
- a clock output for outputting the delayed clock signal to the master device or a succeeding serial-connected device.

22. The slave device of claim 21 wherein the slave device is a memory device.

23. The slave device of claim 21 comprising:
- a command processing circuit that processes the command, wherein the command contains a command identifier that identifies the command as an output delay adjustment command, and contains data indicating how to adjust the output delay.

24. The slave device of claim 23 further comprising:
- a device address register;
- wherein the command further comprises a device address indicating which slave device is to execute the command, the slave device configured to execute the command if the device identifier matches contents of the device address register.

25. The slave device of claim 21 wherein the output delay adjustment circuit comprises:
- for each of a plurality of input signals, inclusive of the input clock signal, a delay circuit that delays the input signal by a selected one of a plurality of delays to produce a delayed version of the input signal.

26. The slave device of claim 25 wherein each output delay circuit comprises M unit delay elements, M>=2, the duty cycle correction circuit further comprising:
- an N-to-M decoder that decodes signals received on N input lines, N>=1, into a selection of how many of the unit delay elements are to be active in producing the delayed version of the input signal.

27. A memory system comprising:
- a plurality of serial-connected slave devices according to claim 18 comprising at least a first slave device and a last slave device;
- a master device connected to the first slave device and to the last slave device;
- the master device configured to output a first clock signal that functions as an input clock signal of the first slave device;
- a clock input for receiving a second clock signal that is an output clock signal of the last slave device;
- a phase detector that determines an amount of phase offset between the first clock signal and the second clock signal;
- a command generator that generates an output delay adjustment command as a function of the amount of phase offset;
- wherein, the first slave device of the plurality of serial-connected slave devices:
  a) receives the first clock signal from the master device as the input clock signal of the first slave device;
  b) generates an output clock signal from the input clock signal;
- wherein each other slave device of the plurality of serial-connected slave devices:
  a) receives the output clock signal of a preceding slave device as an input clock signal of the slave device;
  b) generates an output clock signal from the input clock signal;
- wherein at least one of the plurality of serial-connected slave devices:
  a) receives the output delay adjustment command;
  b) generates the output clock signal of the device by delaying the input clock signal of the device in accordance with the control command.

28. The system of claim 27 wherein the system is a memory system, each slave device is a memory device and the master device is a memory controller.

29. The memory system of claim 27 wherein the command generator is configured to generate the output delay adjustment command for execution by a specified one of the plurality of serial-connected slave devices.

30. The memory system of claim 27 wherein the command generator is configured to generate the output delay adjustment for execution by all of the plurality of serial-connected slave devices.

31. The memory system of 27 wherein generating an output delay adjustment command comprises generating a command containing a command identifier that identifies the command as an output delay adjustment command, and containing data indicating how to adjust the output delay.

* * * * *